United States Patent
Wang et al.

(10) Patent No.: US 11,943,815 B2
(45) Date of Patent: *Mar. 26, 2024

(54) COMMUNICATION METHOD AND APPARATUS

(71) Applicant: Huawei Technologies Co., Ltd., Shenzhen (CN)

(72) Inventors: Lei Wang, Shanghai (CN); Yan Chen, Ottawa (CA); Xiuqiang Xu, Shanghai (CN); Yiqun Wu, Shanghai (CN); Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,832

(22) Filed: Jul. 12, 2022

(65) Prior Publication Data
US 2022/0418004 A1   Dec. 29, 2022

Related U.S. Application Data

(63) Continuation of application No. 16/866,731, filed on May 5, 2020, now Pat. No. 11,419,151, which is a (Continued)

(30) Foreign Application Priority Data

Nov. 6, 2017  (CN) .......................... 201711079615.8

(51) Int. Cl.
*H04W 74/08* (2009.01)
*H04W 74/00* (2009.01)

(52) U.S. Cl.
CPC ..... *H04W 74/0833* (2013.01); *H04W 74/006* (2013.01)

(58) Field of Classification Search
CPC ............. H04W 74/002; H04W 74/006; H04W 74/008; H04W 74/0833; H04W 76/27
See application file for complete search history.

(56) References Cited

U.S. PATENT DOCUMENTS 10,375,737 B2 * 8/2019 Basu Mallick ....... H04W 76/27
10,517,095 B2 * 12/2019 Wong .................... H04L 5/0091
(Continued)

FOREIGN PATENT DOCUMENTS

| CN | 1893725 A | 1/2007 |
| CN | 103491622 A | 1/2014 |
| WO | 2008024788 A2 | 2/2008 |

OTHER PUBLICATIONS

"3rd Generation Partnership Project; Technical Specification Group Radio Access Network; NR; Physical layer procedures for control (Release 15)," 3GPP TS 38.213 V1.0.0, Sep. 2017, 16 pages.
(Continued)

*Primary Examiner* — Liton Miah
(74) *Attorney, Agent, or Firm* — SLATER MATSIL, LLP

(57) ABSTRACT

A communication method and apparatus, the method including sending, by a terminal device, a random access request to a network device, where the random access request includes a random access preamble, control information, and user data, the terminal device is in an inactive state, and the control information includes at least a connection identifier and an authentication identifier, receiving, by the terminal device, a random access response sent by the network device, and performing, by the terminal device, a state transition AND/OR operation corresponding to a message format of the random access response.

20 Claims, 14 Drawing Sheets

Related U.S. Application Data continuation of application No. PCT/CN2018/114133, filed on Nov. 6, 2018.

(56) References Cited

U.S. PATENT DOCUMENTS

| | | | |
|---|---|---|---|
| 2015/0230211 A1* | 8/2015 | You | H04L 5/0051 370/330 |
| 2017/0142666 A1 | 5/2017 | Shimezawa et al. | |
| 2018/0102817 A1 | 4/2018 | Park et al. | |
| 2018/0220465 A1* | 8/2018 | Zhang | H04L 1/0013 |
| 2019/0007248 A1* | 1/2019 | Takeda | H04L 1/1861 |
| 2019/0335515 A1 | 10/2019 | Chen et al. | |
| 2019/0387548 A1 | 12/2019 | Kim | |
| 2020/0045743 A1 | 2/2020 | Lee et al. | |
| 2020/0229235 A1 | 7/2020 | Lu et al. | |
| 2021/0112590 A1 | 4/2021 | Kim et al. | |

OTHER PUBLICATIONS

"3rd Generation Partnership Project; Technical Specification Group Radio Access Network; NR; Medium Access Control (MAC) protocol specification (Release 15)," 3GPP TS 38.321 V1.0.0, Sep. 2017, 46 pages.

"On NR random-Access Response Signal Format," Agenda Item: 7.1.2.5, Source: Ericsson, Document for: Discussion, Decision, 3GPP TSG-RAN WG1 Meeting #87, R1-1611912, Reno, NV, USA, Nov. 14-18, 2016, 3 pages.

"2-Step Random Access Procedure," Source: ZTE, ZTE Microelectronics, Agenda Item: 5.1.1.4.3, Document for: Discussion and Decision, 3GPP TSG RAN WG1 AH_NR Meeting, R1-1700105, Jan. 16-20, 2017, 9 pages.

"Discussions on 2 Steps RACH Procedure," Source: SONY, Agenda item: 5.1.1.4.3, Document for: Discussion and Decision, 3GPP TSG RAN WG1 Meeting AH_NR Meeting, R1-1700668, Jan. 16-20, 2017, 5 pages.

"2-Step Random Access Procedure," Agenda Item: 5.1.1.4.3, Source: InterDigital Communications, Document for: Discussion, Decision, 3GPP TSG RAN WG1 AH_NR Meeting, R1-1700703, Jan. 16-20, 2017, 4 pages.

"Remaining Details on RACH Procedure," Agenda Item: 7.1.4.2, Source: Ericsson, Document for: Discussion and Decision, 3GPP TSG RAN WG1 Meeting #90bis, R1-1718716, Prague, Czech Republic, Oct. 9-13, 2017, 16 pages.

"Data Transmission in INACTIVE," Agenda item: 9.2.2.1, Source: Nokia, Alcatel-Lucent Shanghai Bell, WID/SID: FS_NR_newRAT—Release 14, Document for: Discussion and Decision, 3GPP TSG-RAN WG2 Meeting #96, R2-167706, Nov. 14-18, 2016, 7 pages.

"UL Small Data Transmission in Inactive State," Source: CATT, Agenda Item:9.2.2.1, Document for: Discussion and Decision, 3GPP TSG-RAN WG2 Meeting #96, R2-167954, Nov. 14-18, 2016, 6 pages.

"Data Transfer in Inactive State Based on 4-Step RACH Procedures," Agenda item: 10.2.2.2., Source: Samsung, Document for: Discussion & Decision, 3GPP TSG-RAN WG2 #97, R2-1701529, resubmission of R2-1700366, Feb. 13-17, 2017, 7 pages.

"Data transmission in Inactive State, option A vs. Option B," Agenda Item: 10.2.2.2, Source: Huawei, HiSilicon, Document for: Discussion and Decision, 3GPP TSG-RAN WG2 #97, R2-1702058, Feb. 13-17, 2017, 5 pages.

"Procedures for State Transition in RRC_INACTIVE," Agenda Item: 10.4.1.2, Source: InterDigital Inc., Document for: Discussion, Decision, 3GPP TSG-RAN WG2 #98, R2-1704926, May 15-19, 2017, 4 pages.

"Consideration on the Procedure Design for Transition from INACTIVE to CONNECTED State and for RRC Connection Re-Establishment," Agenda Item: 10.4.1.3.2, Source: Huawei, HiSilicon, Document for: Discussion and Decision, 3GPP TSG-RAN WG2#99, R2-1708700, Revision of R2-1706729, Aug. 21-25, 2017, 4 pages.

"Details of Solution B for Small Data Transmission in RRC_INACTIVE," Agenda Item: 10.2.2.2, Source: Ericsson, Document for: Discussion, Decision, 3GPP TSG-RAN WG2 #97, Tdoc R2-1700890, Athens, Greece, Feb. 13-17, 2017, 7 pages.

* cited by examiner

FIG. 4

| | | | | | |
|---|---|---|---|---|---|
| Format 1 | Format | Connection identifier | Timing advance | Cell radio network temporary identifier | Radio resource control message | Downlink data |
| Format 2 | Format | Connection identifier | Timing advance | Downlink data | | |
| Format 3 | Format | Connection identifier | Downlink data | | | |
| Format 4 | Format | Connection identifier | Radio resource control connection reject indication | | | |
| Format 5 | Format | Random access preamble identity | Timing advance | Uplink scheduling information | Cell radio network temporary identifier | Backoff indication |
| Format 6 | Format | Random access preamble identity | Backoff indication | | | |

FIG. 6a

| | | | | |
|---|---|---|---|---|
| Format 1 | Connection identifier | Timing advance | Cell radio network temporary identifier | Radio resource control message | *Downlink data* |
| Format 2 | Connection identifier | Timing advance | *Downlink data* | | |
| Format 3 | Connection identifier | *Downlink data* | | | |
| Format 4 | Connection identifier | Radio resource control connection reject indication | | | |
| Format 5 | Random access preamble identity | Timing advance | Uplink scheduling information | Cell radio network temporary identifier | *Backoff indication* |
| Format 6 | Random access preamble identity | *Backoff indication* | | | |

FIG. 6c

COMMUNICATION METHOD AND APPARATUS

CROSS-REFERENCE TO RELATED APPLICATIONS

This application is a continuation of U.S. patent application Ser. No. 16/866,731, filed on May 5, 2020, which is a continuation of International Application No. PCT/CN2018/114133, filed on Nov. 6, 2018. The International Application claims priority to Chinese Patent Application No. 201711079615.8, filed on Nov. 6, 2017. All of the aforementioned patent applications are hereby incorporated by reference in their entireties.

TECHNICAL FIELD

This application relates to the field of communications technologies, and in particular, to a communication method and a communications apparatus.

BACKGROUND

In a long term evolution (LTE) communications system, radio resource control (RRC) generally has two states: a connected state and an idle state. In a next-generation wireless communications system, namely, a new radio (NR) communications system such as a fifth-generation mobile communications system ($5^{th}$ generation, 5G), a new state, namely, an inactive state, is added. In the inactive state, both a terminal device and a network device store access stratum context (AS context) information of an RRC connection in the connected state. When the terminal device switches from the inactive state to the connected state, a random access procedure needs to be performed, and an original connection needs to be restored from stored information. After entering the connected state, the terminal device may send data to the network device. FIG. 1 is a schematic diagram of a random access procedure in the LTE system. The terminal device first switches from the idle state to the connected state through four times of interaction, and then sends data. In the inactive state, there is no corresponding solution for how the terminal device performs data communication with a network side.

SUMMARY

This application provides a communication method and a communications apparatus, to ensure implementation of data communication between a terminal device in an inactive state and a network side.

According to a first aspect of this application, a communication method is provided and includes sending, by a terminal device, a random access request to a network device, where the random access request includes a random access preamble, control information, and user data, the terminal device is in an inactive state, and the control information includes at least a connection identifier and an authentication identifier, receiving, by the terminal device, a random access response sent by the network device, and performing, by the terminal device, a state transition AND/OR operation corresponding to a message format of the random access response. In the first aspect, the terminal device in the inactive state adds the connection identifier and the authentication identifier to the random access request, to ensure implementation of data communication between the terminal device and a network side. If the network device does not obtain the connection identifier or the authentication identifier, the network device cannot know a sender of the user data in the random access request, and discards the user data. In this case, current data communication initiated by the terminal device in the inactive state is invalid data communication, in other words, data communication between the terminal device and the network device fails.

In an implementation, the performing, by the terminal device, a state transition AND/OR operation corresponding to a message format of the random access response includes at least one of the following operations: switching, by the terminal device, to a connected state based on the random access response in a first message format, maintaining, by the terminal device, the inactive state and adjusting uplink timing based on the random access response in a second message format, maintaining, by the terminal device, the inactive state based on the random access response in a third message format, where data corresponding to the random access response in the third message format is successfully sent, maintaining, by the terminal device, the inactive state or switching to an idle state based on the random access response in a fourth message format, where data corresponding to the random access response in the fourth message format fails to be sent, sending, by the terminal device, a radio resource control RRC connection request to the network device based on the random access response in a fifth message format, and resending, by the terminal device, the random access request to the network device based on the random access response in a sixth message format. In this implementation, random access responses in different message formats instruct the terminal device to perform different state transition AND/OR operations.

In another implementation, the method further includes obtaining, by the terminal device, a transmission parameter, where the transmission parameter includes at least one of the following parameters: a time-frequency resource used to transmit the control information and the user data, a modulation and coding scheme parameter, an encryption parameter, a cyclic prefix length, and a reference signal parameter, and the sending, by a terminal device, a random access request to a network device includes sending, by the terminal device, the control information and the user data in the random access request by using the transmission parameter.

In still another implementation, the method further includes obtaining, by the terminal device, a random access parameter, where the random access parameter includes at least one of the following parameters: a random access preamble sequence generation parameter and a corresponding time-frequency resource, a random access response receive window parameter, a beam-related parameter, a random access preamble sequence subset division manner, and a backoff parameter.

In still another implementation, the method further includes determining, by the terminal device, the message format of the random access response based on a message format field in the random access response. In this implementation, the message format field is set in the random access response, and the terminal device may clearly know the message format of the random access response based on the message format field.

In still another implementation, the method further includes obtaining, by the terminal device, a transport block size corresponding to the random access response, and determining, by the terminal device, the message format of the random access response based on the transport block size, where each message format of the random access response corresponds to one transport block size, and different message formats correspond to different transport block sizes. In this implementation, the terminal device may determine the message format of the random access response based on the transport block size corresponding to the random access response, so that signaling overheads are small.

In still another implementation, the method further includes receiving, by the terminal device, downlink control information corresponding to the random access response, where the downlink control information carries message format information of the random access response, and determining, by the terminal device, the message format of the random access response based on the downlink control information. In this implementation, the message format information of the random access response is carried in the downlink control information, and the terminal device may clearly know the message format of the random access response based on the message format information.

In still another implementation, the method further includes determining, by the terminal device, the message format of the random access response based on a time window in which the terminal device receives the random access response, where each message format of the random access response corresponds to one time window, and different message formats correspond to different time windows. In this implementation, the network device sends the random access response in different time windows, and the terminal device may determine the message format of the random access response based on the time window in which the terminal device receives the random access response, so that signaling overheads are small.

According to a second aspect of this application, a communication method is provided and includes receiving, by a network device, a random access request sent by a terminal device, where the random access request includes a random access preamble, control information, and user data, the terminal device is in an inactive state, and the control information includes at least a connection identifier and an authentication identifier, and sending, by the network device, a random access response to the terminal device, where the random access response has at least two message formats, and each message format corresponds to one state transition AND/OR operation. In the second aspect, the network device receives the random access request sent by the terminal device in the inactive state, and the random access request includes the connection identifier and the authentication identifier, so that implementation of data communication between the terminal device and a network side is ensured. If the network device does not obtain the connection identifier or the authentication identifier, the network device cannot know a sender of the user data in the random access request, and discards the user data. In this case, current data communication initiated by the terminal device in the inactive state is invalid data communication, in other words, data communication between the terminal device and the network device fails.

In an implementation, the method further includes determining, by the network device, a message format of the random access response based on at least one of the following factors: a detection result of the random access preamble, a decoding and parsing result of the control information and the user data, and a current network status. In this implementation, the message format of the random access response is determined based on at least one of the detection result of the random access preamble, the decoding and parsing result of the control information and the user data, and the current network status.

In another implementation, the network device indicates the message format of the random access response in at least one of the following manners: the random access response includes a message format field, and the message format field is used to indicate the message format of the random access response, the network device further sends first downlink control information corresponding to the random access response, where the first downlink control information includes a time-frequency resource and a modulation and coding scheme that are corresponding to the random access response, the time-frequency resource and the modulation and coding scheme are used to determine a transport block size corresponding to the random access response, and each transport block size corresponds to one message format, and the network device further sends second downlink control information corresponding to the random access response, where the second downlink control information includes message format information of the random access response. In this implementation, the message format field is set in the random access response, and the terminal device can clearly know the message format of the random access response based on the message format field, or the terminal device may determine the message format of the random access response based on the transport block size corresponding to the random access response, so that signaling overheads are small, or the message format information of the random access response is carried in downlink control information (DCI), and the terminal device can clearly know the message format of the random access response based on the message format information.

In still another implementation, the receiving, by a network device, a random access request sent by a terminal device includes receiving, by the network device, a plurality of random access requests separately sent by the terminal device by using a plurality of beams, the method further includes selecting, by the network device, one random access request from the plurality of random access requests based on a specified signal quality condition, and the sending, by the network device, a random access response to the terminal device includes sending, by the network device, the random access response corresponding to the selected random access request. In this implementation, the terminal device sends the plurality of random access requests by using the plurality of beams, and the network device may select, from the plurality of random access requests, a random access request that meets the signal quality condition, thereby improving random access reliability.

With reference to the first aspect and the second aspect, in an implementation, the message format of the random access response is specifically one of the following message formats: the first message format, where the random access response in the first message format includes at least one of the following fields: a connection identifier, an uplink timing advance, a cell radio network temporary identifier, and a radio resource control message, the second message format, where the random access response in the second message format includes at least one of the following fields: a connection identifier and an uplink timing advance, the third message format, where the random access response in the third message format includes at least a connection identifier, the fourth message format, where the random access response in the fourth message format includes at least one of the following fields: a connection identifier and a radio resource control connection reject indication, the fifth message format, where the random access response in the fifth message format includes at least one of the following fields: a random access preamble sequence identifier, an uplink timing advance, uplink scheduling information, a cell radio network temporary identifier, and a backoff indication, and the sixth message format, where the random access response in the sixth message format includes at least one of the following fields: a random access preamble sequence identifier and a backoff indication. In this implementation, there are a plurality of different message formats of the random access response, and random access responses of different message formats correspond to different state transition AND/OR operations.

With reference to the first aspect and the second aspect, in another implementation, the connection identifier is used to identify a radio resource control connection before the terminal device switches from the connected state to the inactive state, or the connection identifier is used to identify access stratum context information that is of a radio resource control connection and that is stored when the terminal device switches from the connected state to the inactive state. In this implementation, the terminal device in the inactive state adds the connection identifier and the authentication identifier to the random access request, so that a data bearer can be set up in a random access procedure, thereby implementing data communication between the terminal device and the network side.

With reference to the first aspect and the second aspect, in still another implementation, the authentication identifier is used by the network device to perform identity authentication on the terminal device.

With reference to the first aspect and the second aspect, in still another implementation, the control information may further include at least one of the following information: a data transmission reason and a switch-to-the-connected-state request.

According to a third aspect of this application, a communications apparatus is provided, and can implement the foregoing communication method. For example, the communications apparatus may be a chip (such as a baseband chip or a communications chip) or a device (such as a terminal device). The foregoing method may be implemented by using software or hardware, or by hardware executing corresponding software.

In a possible implementation, a processor and a memory are included in a structure of the communications apparatus. The processor is configured to support the apparatus in performing a corresponding function in the foregoing communication method. The memory is configured to be coupled to the processor, and stores a program (an instruction) and/or data necessary for the apparatus. Optionally, the communications apparatus may further include a communications interface, configured to support communication between the apparatus and another network element.

In another possible implementation, the communications apparatus may include a sending unit, a receiving unit, and a processing unit. The sending unit and the receiving unit are respectively configured to implement a sending function and a receiving function in the foregoing method, and the processing unit is configured to implement a processing function in the foregoing method. For example, the sending unit is configured to send a random access request to a network device, where the random access request includes a random access preamble, control information, and user data, the communications apparatus is in an inactive state, and the control information includes at least a connection identifier and an authentication identifier, and the receiving unit is configured to receive a random access response sent by the network device, and the processing unit is configured to perform a state transition AND/OR operation corresponding to a message format of the random access response.

Optionally, the message format of the random access response is specifically one of the following message formats: a first message format, where the random access response in the first message format includes at least one of the following fields: a connection identifier, an uplink timing advance, a cell radio network temporary identifier, and a radio resource control message, a second message format, where the random access response in the second message format includes at least one of the following fields: a connection identifier and an uplink timing advance, a third message format, where the random access response in the third message format includes at least a connection identifier, a fourth message format, where the random access response in the fourth message format includes at least one of the following fields: a connection identifier and a radio resource control connection reject indication, a fifth message format, where the random access response in the fifth message format includes at least one of the following fields: a random access preamble sequence identifier, an uplink timing advance, uplink scheduling information, a cell radio network temporary identifier, and a backoff indication, and a sixth message format, where the random access response in the sixth message format includes at least one of the following fields: a random access preamble sequence identifier and a backoff indication.

Optionally, the processing unit is further configured to perform at least one of the following operations: switching a state of the communications apparatus to a connected state based on the random access response in the first message format, maintaining a state of the communications apparatus in the inactive state and adjusting uplink timing based on the random access response in the second message format, maintaining a state of the communications apparatus in the inactive state based on the random access response in the third message format, where data corresponding to the random access response in the third message format is successfully sent, maintaining a state of the communications apparatus in the inactive state or switching a state of the communications apparatus to an idle state based on the random access response in the fourth message format, where data corresponding to the random access response in the fourth message format fails to be sent, generating a radio resource control RRC connection request based on the random access response in the fifth message format, and regenerating the random access request based on the random access response in the sixth message format.

Optionally, the processing unit is further configured to obtain a transmission parameter, where the transmission parameter includes at least one of the following parameters: a time-frequency resource used to transmit the control information and the user data, a modulation and coding scheme parameter, an encryption parameter, a cyclic prefix length, and a reference signal parameter, and the sending unit is specifically configured to send the control information and the user data in the random access request by using the transmission parameter.

Optionally, the processing unit is further configured to obtain a random access parameter, where the random access parameter includes at least one of the following parameters: a random access preamble sequence generation parameter and a corresponding time-frequency resource, a random access response receive window parameter, a beam-related parameter, a random access preamble sequence subset division manner, and a backoff parameter.

Optionally, the processing unit is further configured to determine the message format of the random access response based on a message format field in the random access response.

Optionally, the processing unit is further configured to obtain a transport block size corresponding to the random access response, and determine the message format of the random access response based on the transport block size, where each message format of the random access response corresponds to one transport block size, and different message formats correspond to different transport block sizes.

Optionally, the receiving unit is further configured to receive downlink control information corresponding to the random access response, where the downlink control information carries message format information of the random access response, and the processing unit is further configured to determine the message format of the random access response based on the downlink control information.

Optionally, the processing unit is further configured to determine the message format of the random access response based on a time window in which the terminal device receives the random access response, where each message format of the random access response corresponds to one time window, and different message formats correspond to different time windows.

Optionally, the connection identifier is used to identify a radio resource control connection before the communications apparatus switches from the connected state to the inactive state, or the connection identifier is used to identify access stratum context information that is of a radio resource control connection and that is stored when the communications apparatus switches from the connected state to the inactive state.

Optionally, the authentication identifier is used by the network device to perform identity authentication on the communications apparatus.

Optionally, the control information may further include at least one of the following information: a data transmission reason and a switch-to-the-connected-state request.

When the communications apparatus is a chip, the receiving unit may be an input unit, such as an input circuit or a communications interface, and the sending unit may be an output unit, such as an output circuit or a communications interface. When the communications apparatus is a device, the receiving unit may be a receiver, and the sending unit may be a transmitter.

According to a fourth aspect of this application, a communications apparatus is provided, and can implement the foregoing communication method. For example, the communications apparatus may be a chip (such as a baseband chip or a communications chip) or a device (such as a network device or a baseband board). The foregoing method may be implemented by using software or hardware, or by hardware executing corresponding software.

In a possible implementation, a processor and a memory are included in a structure of the communications apparatus. The processor is configured to support the apparatus in performing a corresponding function in the foregoing communication method. The memory is configured to be coupled to the processor, and stores a program (an instruction) and/or data necessary for the apparatus. Optionally, the communications apparatus may further include a communications interface, configured to support communication between the apparatus and another network element.

In another possible implementation, the communications apparatus may include a receiving unit and a sending unit. The sending unit and the receiving unit are respectively configured to implement a sending function and a receiving function in the foregoing method. For example, the receiving unit is configured to receive a random access request sent by a terminal device, where the random access request includes a random access preamble, control information, and user data, the terminal device is in an inactive state, and the control information includes at least a connection identifier and an authentication identifier, and the sending unit is configured to send a random access response to the terminal device, where the random access response has at least two message formats, and each message format corresponds to one state transition AND/OR operation.

When the communications apparatus is a chip, the receiving unit may be an input unit, such as an input circuit or a communications interface, and the sending unit may be an output unit, such as an output circuit or a communications interface. When the communications apparatus is a device, the receiving unit may be a receiver, and the sending unit may be a transmitter.

Optionally, the communications apparatus further includes a processing unit, where the processing unit is configured to determine a message format of the random access response based on at least one of the following factors: a detection result of the random access preamble, a decoding and parsing result of the control information and the user data, and a current network status.

Optionally, the message format of the random access response is indicated in at least one of the following manners: the random access response includes a message format field, and the message format field is used to indicate the message format of the random access response, the sending unit is further configured to send first downlink control information corresponding to the random access response, where the first downlink control information includes a time-frequency resource and a modulation and coding scheme that are corresponding to the random access response, the time-frequency resource and the modulation and coding scheme are used to determine a transport block size corresponding to the random access response, and each transport block size corresponds to one message format, and the sending unit is further configured to send second downlink control information corresponding to the random access response, where the second downlink control information includes message format information of the random access response.

Optionally, the receiving unit is specifically configured to receive a plurality of random access requests separately sent by the terminal device by using a plurality of beams, the processing unit is further configured to select one random access request from the plurality of random access requests based on a specified signal quality condition, and the sending unit is specifically configured to send the random access response corresponding to the selected random access request.

Optionally, the message format of the random access response is specifically one of the following message formats: a first message format, where the random access response in the first message format includes at least one of the following fields: a connection identifier, an uplink timing advance, a cell radio network temporary identifier, and a radio resource control message, a second message format, where the random access response in the second message format includes at least one of the following fields: a connection identifier and an uplink timing advance, a third message format, where the random access response in the third message format includes at least a connection identifier, a fourth message format, where the random access response in the fourth message format includes at least one of the following fields: a connection identifier and a radio resource control connection reject indication, a fifth message format, where the random access response in the fifth message format includes at least one of the following fields: a random access preamble sequence identifier, an uplink timing advance, uplink scheduling information, a cell radio network temporary identifier, and a backoff indication, and a sixth message format, where the random access response in the sixth message format includes at least one of the following fields: a random access preamble sequence identifier and a backoff indication.

Optionally, the connection identifier is used to identify a radio resource control connection before the terminal device switches from the connected state to the inactive state, or the connection identifier is used to identify access stratum context information that is of a radio resource control connection and that is stored when the terminal device switches from the connected state to the inactive state.

Optionally, the authentication identifier is used by the communications apparatus to perform identity authentication on the terminal device.

Optionally, the control information may further include at least one of the following information: a data transmission reason and a switch-to-the-connected-state request.

According to a fifth aspect of this application, a computer-readable storage medium is provided. The computer-readable storage medium stores an instruction, and when the instruction is run on a computer, the computer is enabled to perform the methods in the foregoing aspects.

According to a sixth aspect of this application, a computer program product including an instruction is provided. When the computer program product is run on a computer, the computer is enabled to perform the methods in the foregoing aspects.

BRIEF DESCRIPTION OF THE DRAWINGS

To describe the technical solutions in the embodiments of the presented principles or in the background more clearly, the following briefly describes the accompanying drawings required for describing the embodiments of the presented principles or the background.

FIG. 4 is a schematic diagram of a message format of a random access response;

FIG. 6a to FIG. 6c are schematic diagrams of a message format of a random access response;

DETAILED DESCRIPTION OF ILLUSTRATIVE EMBODIMENTS

The following describes the embodiments of the presented principles with reference to the accompanying drawings in the embodiments.

Figure 1:
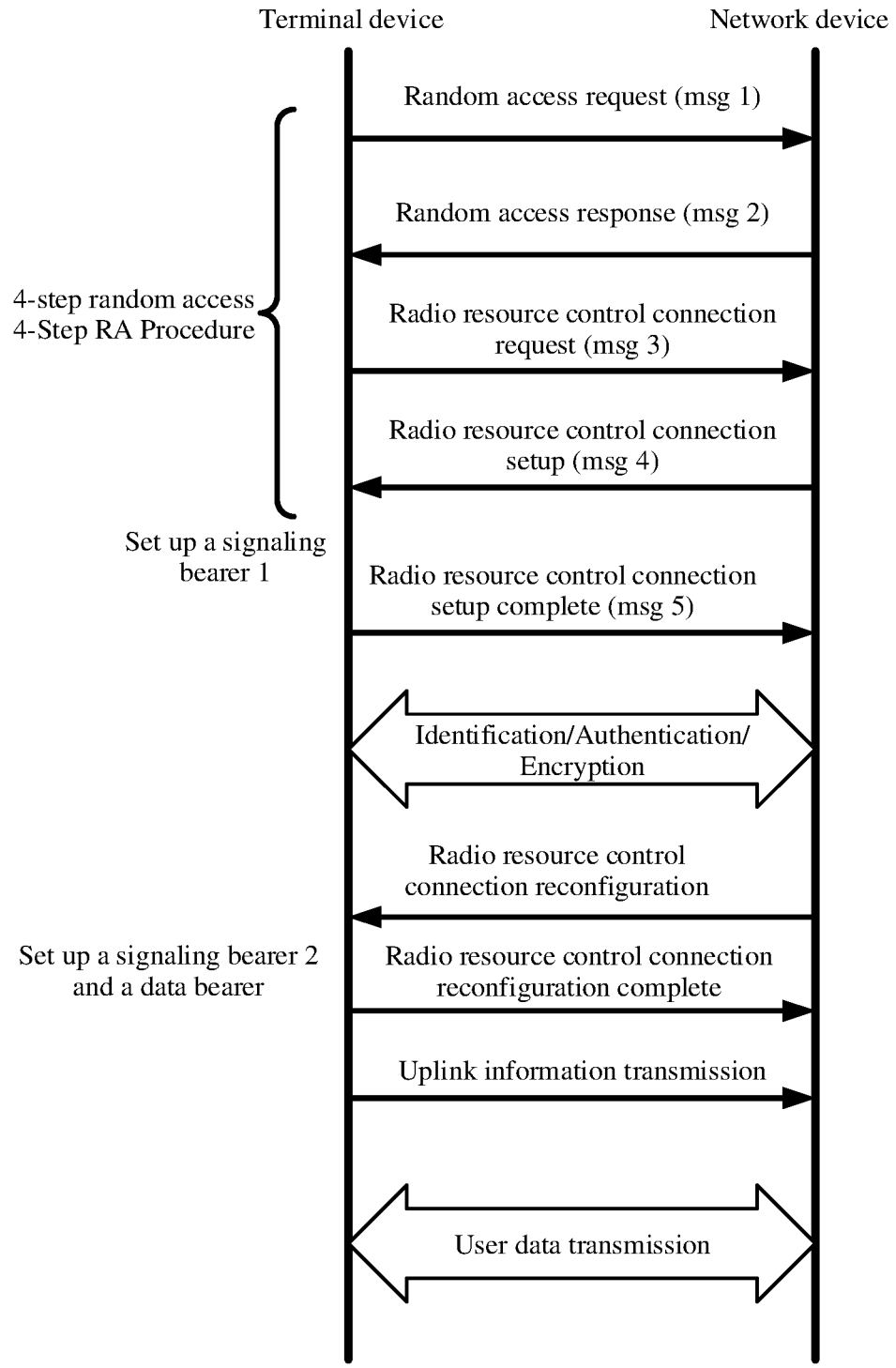
FIG. 1 is a schematic diagram of a random access procedure in an LTE system.
Figure 2:
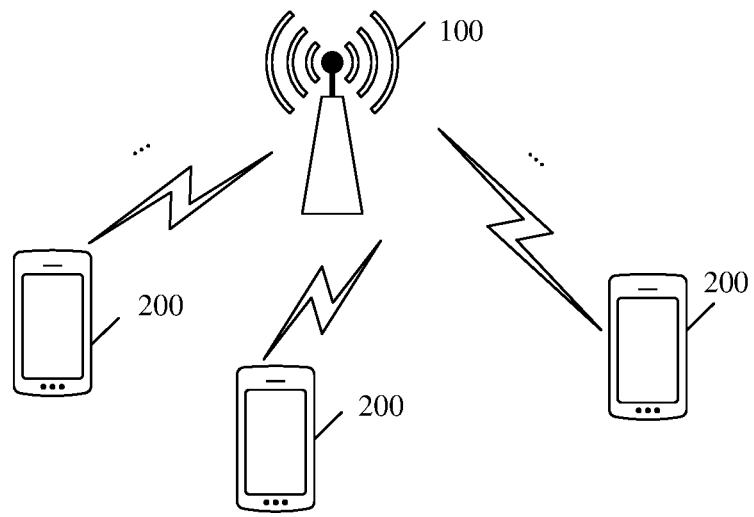
FIG. 2 is a schematic diagram of a communications system according to an embodiment.

FIG. 2 is a schematic diagram of a communications system according to an embodiment. The communications system may include at least one network device 100 (only one is shown) and one or more terminal devices 200 connected to the network device 100.

The network device 100 may be a device that can communicate with the terminal device 200. The network device 100 may be any device with a wireless transmitting/receiving function. The network device 100 includes but is limited to a base station (for example, a NodeB NodeB, an evolved NodeB (eNodeB), a base station in a fifth-generation (5G) communications system, a base station or a network device in a future communications system, an access node in a WiFi system, a radio relay node, or a wireless backhaul node) and the like. The network device 100 may be alternatively a radio controller in a cloud radio access network (CRAN) scenario. The network device 100 may be alternatively a network device in a 5G network or a network device in a future evolved network, or may be a wearable device, an in-vehicle device, or the like. The network device 100 may be alternatively a small cell, a transmission reference point (TRP), or the like. Certainly, this is not limited in this application.

The terminal device 200 is a device that has a wireless transmitting/receiving function and may be deployed on land, including indoor or outdoor, handheld, wearable, or in-vehicle, or may be deployed on a water surface (such as a ship), or may be deployed in the air (for example, a plane, a balloon, or a satellite). The terminal device may be a mobile phone, a tablet computer (Pad), a computer with a wireless transmitting/receiving function, a virtual reality (VR) terminal device, an augmented reality AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in this embodiment of this application. The terminal device may sometimes be referred to as user equipment (UE), an access terminal device, a UE unit, a UE station, a mobile station, a mobile console, a remote station, a remote terminal device, a mobile device, a UE terminal device, a terminal device, a terminal (terminal), a wireless communications device, a UE agent, a UE apparatus, or the like.

It should be noted that the terms "system" and "network" in the embodiments may be used interchangeably. "A plurality of" means two or more, and in view of this, "a plurality of" may also be understood as "at least two" in the embodiments. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects. In addition, for ease of clearly describing the technical solutions in the embodiments of this application, in the embodiments of this application, words such as "first"

and "second" are used to distinguish between same items or similar items whose functions and functions are basically the same. A person skilled in the art may understand that the words such as "first" and "second" do not limit a quantity and an execution sequence, and the words such as "first" and "second" are not necessarily different.

Figure 3:
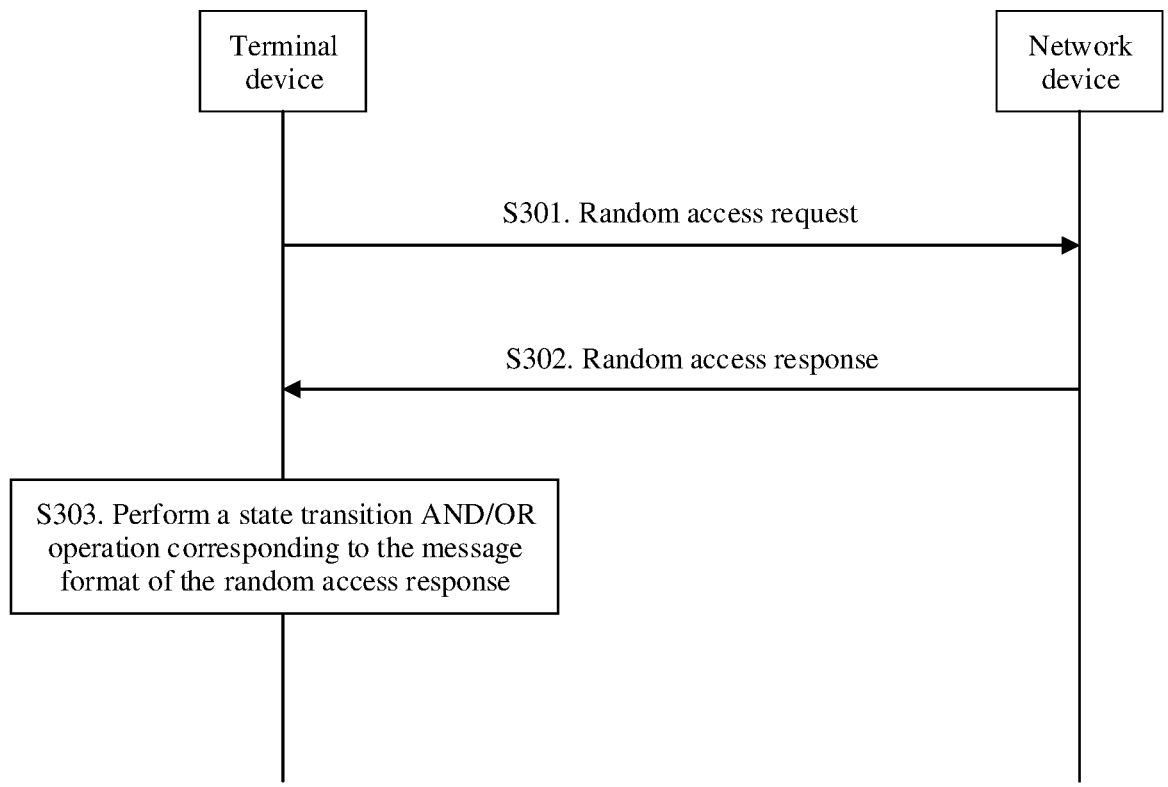
FIG. 3 is a schematic interaction flowchart of a communication method according to an embodiment.

FIG. 3 is a schematic interaction flowchart of a communication method according to an embodiment. The method may include the following steps.

S301. A terminal device sends a random access request to a network device.

S302. The network device receives the random access request sent by the terminal device, and sends a random access response to the terminal device.

S303. The terminal device receives the random access response sent by the network device, and performs a state transition AND/OR operation corresponding to a message format of the random access response.

The terminal device sends a request to the network device. The request is used to initiate random access, and the request may be referred to as a random access request, a random access request message, a message 1 (msg1), a random access preamble (preamble), or another user-defined name. This is not limited herein. In this embodiment, the random access request is used as an example for description. In S302, the response is used to respond to the foregoing request, and may be referred to as a random access response, a random access response message, a message 2 (msg2), or another user-defined name. This is not limited herein. In this embodiment, the random access response is used as an example for description.

In this embodiment, when sending the random access request, the terminal device is in an inactive state. When the terminal device switches from a connected state to the inactive state, the terminal device stores related content in the connected state, and this part of content is referred to as access stratum context information of an RRC connection.

The terminal device sends the random access request. As shown in Table 1, the random access request includes a random access preamble, control information, and user data. Optionally, if the terminal device has kept uplink synchronization when sending the random access request, for example, in a case, when the network device successfully decodes the control information and the user data that are sent by the terminal device in the inactive state, and the network device feeds back an uplink timing advance (TA) in the random access response, uplink synchronization of the terminal device is completed and may be kept for a period of time, but the terminal device is still in the inactive state, and when transmitting data again and still keeping uplink synchronization, the terminal device may not send the preamble, and a format of the random access request of the terminal device is shown in Table 2, and in another case, after the terminal device switches from the connected state to the inactive state, if a previously synchronized TA is still valid and the terminal device needs to be send user data to the network device, the terminal device may also send a random access request in a message format shown in Table 2.

TABLE 1

| Random access preamble | Control information | User data |
| --- | --- | --- |

TABLE 2

| Control information | User data |
| --- | --- |

The preamble is selected by the terminal device from a set of available preambles. The network device determines the TA by detecting the preamble.

The control information includes at least a connection identifier and an authentication identifier.

The connection identifier is used to identify an RRC connection before the terminal device switches from the connected state to the inactive state, or the connection identifier is used to identify access stratum context information that is of an RRC connection and that is stored when the terminal device switches from the connected state to the inactive state. Specifically, when instructing the terminal device to switch from the connected state to the inactive state, the network device allocates an identifier to the terminal device, and the identifier is used to restore a radio resource control (RRC) connection. Generally, the connection identifier may be specifically an RRC identifier (ID) or an RRC resume identity, in other words, the connection identifier is used to identify the RRC connection before the terminal device switches from the connected state to the inactive state, or the connection identifier may be specifically an AS context ID, in other words, the connection identifier is used to identify the access stratum context information that is of the RRC connection and that is stored when the terminal device switches from the connected state to the inactive state. In other words, when receiving the random access request, the network device may obtain the access stratum context information of the RRC connection based on the control information.

The authentication identifier is used by the network device to perform identity authentication on the terminal device. Specifically, the authentication identifier is separately calculated by the terminal device and the network device. A calculation is completed by using a specified algorithm and using an RRC-related key (for example, K_RRCint), a counter, and some known parameters (for example, a cell identifier) as input parameters. After the terminal device sends the authentication identifier to the network device, the network device compares the received authentication identifier with an authentication identifier calculated by the network device. If the authentication identifiers match, a subsequent procedure is performed. Otherwise, it is considered that the user data is invalid and the user data is discarded.

Optionally, the control information may further include at least one of the following information: a data transmission reason and a switch-to-the-connected-state request. A data transmission reason field is used to notify the network device of a trigger factor of current transmission. The switch-to-the-connected-state request is used by the terminal device to suggest whether to switch to the connected state subsequently. When the terminal device expects to switch to the connected state after the current transmission is completed, the terminal device provides a suggestion for the network device by setting a connection request to a specific value. The network device may determine, based on this field, whether to switch the terminal device to the connected state. It should be noted that a preamble sequence may also be divided. The terminal device may select a sequence to indicate whether to switch to the connected state subsequently, so that signaling overheads are small.

Further, the control information and the user data may be transmitted as a same transport block (TB). The control information may be transmitted as control information of a layer 2, such as, a media access control control element (MAC CE) or a MAC sub-header, or may be transmitted as control information of a layer 3, such as, an RRC message. Uplink user data may be a data unit encapsulated by using an upper layer, and the upper layer means a packet data convergence protocol (PDCP) sublayer and a radio link control (radio link control, RLC) sublayer. A bearer parameter required for transmitting the control information and the user data may be predefined (for example, specified by a standard protocol) or may be a preset value, and a bearer includes a radio bearer and a core network bearer.

The network device detects a received signal, detects a preamble, and decodes and parses control information and user data.

First, if the network device detects a preamble sequence of the random access preamble (the random access preamble may be a preamble sequence) in the random access request or some sequences in the random access preamble (the random access preamble may include a plurality of sequences or a plurality of repetitions of one sequence), the network device generates the random access response corresponding to the random access request. The random access response may be carried by a physical downlink shared channel (PDSCH). The network device further sends downlink control information (DCI) corresponding to the random access response. The DCI is used to indicate information such as a time-frequency resource of the PDSCH that carries the random access response and an MCS corresponding to the PDSCH. The DCI may be identified by a random access-radio network temporary identifier (RA-RNTI), and an identification manner is that cyclic redundancy check (CRC) of the DCI is scrambled by using the RA-RNTI. The DCI may be carried by a physical downlink control channel (PDCCH). If the terminal device correctly descrambles the DCI by using the RA-RNTI, the terminal device may determine that the DCI is used for the random access response. If the network device fails to detect the preamble, the network device makes no response.

Then, the network device decodes the control information and the user data, and performs parsing based on the control information obtained after successfully performing decoding, to obtain the connection identifier and the authentication identifier through parsing. Further, the network device obtains the connection identifier through decoding, and restores, based on the connection identifier, the access stratum context information of the RRC connection that is associated with the connection identifier. The context information includes a parameter of a bearer associated with the RRC connection and a parameter used to calculate the authentication identifier (for example, MAC-I) of the terminal device. Then, the network device authenticates a user identity, in other words, matches the authentication identifier obtained through decoding with an authentication identifier calculated based on the parameter that is included in the context information and that is used to calculate the authentication identifier. If the authentication identifiers match, a subsequent procedure is performed. Otherwise, it is considered that the user data is invalid, and the user data is discarded.

The network device needs to indicate a state transition and/or operation of the terminal device based on one or more of a detection result of the preamble, a decoding and parsing result of the control information and the user data, and a current network status. Therefore, in this embodiment, the random access response has at least two message formats, and each message format corresponds to one state transition AND/OR operation.

Figure 4:
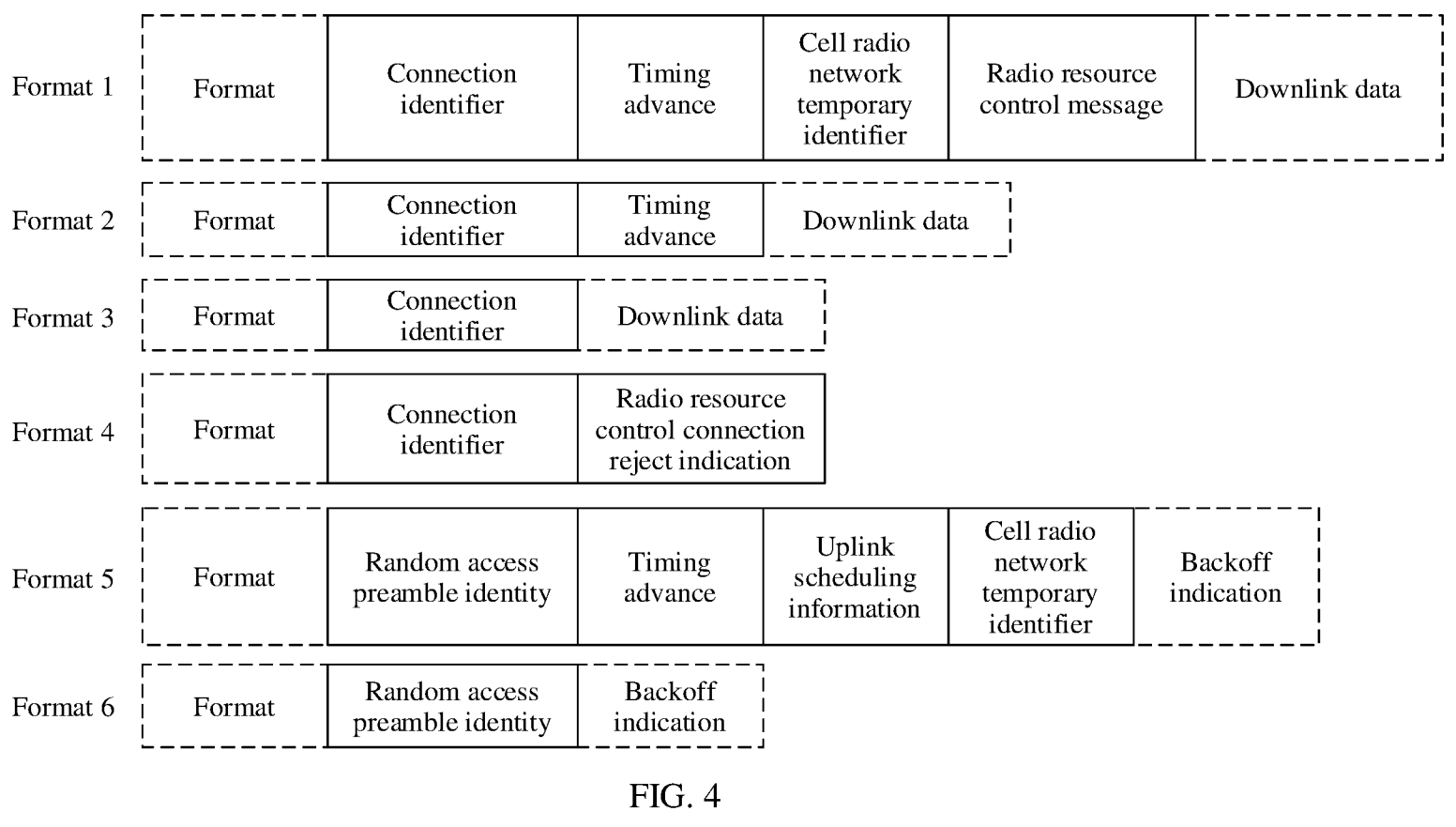

Specifically, each message format includes one or more fields. The terminal device may perform a corresponding state transition AND/OR operation based on content of the field. For example, a schematic diagram of a message format of a random access response shown in FIG. 4 shows random access responses in six message formats. Certainly, this is not limited thereto. Fields included in the random access responses in the six message formats are respectively a first message format (Format 1), a second message format (Format 2), a third message format (Format 3), a fourth message format (Format 4), a fifth message format (Format 5), and a sixth message format (Format 6).

A random access response in the first message format includes at least one of the following fields: a connection identifier (connection identifier/identification, Connection ID), a TA, a cell-radio network temporary identifier (C-RNTI). Optionally, the random access response in the first message format may further include an RRC message (RRC Msg), a message format field (Format), and/or downlink data (DL Data). The RRC message includes configuration information of some signaling bearers (for example, a signaling bearer 2) and a data bearer, and specifically includes a related parameter (for example, a physical downlink shared channel (PDSCH), a physical uplink control channel (physical uplink control channel, PUCCH), a physical uplink shared channel (PUSCH), a channel sounding reference signal (SRS), antenna relevancy, or a scheduling request (SR)) of a corresponding physical layer, a media access control (MAC) layer parameter (for example, a shared channel (SCH), discontinuous reception (DRX), or a transmit power headroom (PHR)), a radio link control (RLC) layer parameter, a packet data convergence protocol (packet data convergence protocol, PDCP) layer parameter, and the like. Optionally, the random access response in the first message format may further include a format field and/or a downlink data (DL Data) field, the format field is used to indicate that a message format of the random access response in which the format field is located is the first message format, and the DL data field is used to carry downlink user data that is sent by the network device to the terminal device.

A random access response in the second message format includes at least one of the following fields: a connection identifier and a TA. Optionally, the random access response in the second message format may further include a format field and/or a DL data field. The format field in the random access response in the second message format is used to indicate that a message format of the random access response in which the format field is located is the second message format.

A random access response in the third message format includes at least a connection identifier. Optionally, the random access response in the third message format may further include a format field and/or a DL data field. The format field in the random access response in the third message format is used to indicate that a message format of the random access response in which the format field is located is the third message format.

A random access response in the fourth message format includes at least one of the following fields: a connection identifier and a radio resource control connection reject indication (RRC reject). Optionally, the random access response in the fourth message format may further include a format field. The format field in the random access response in the fourth message format is used to indicate that a message format of the random access response in which the format field is located is the fourth message format.

A random access response in the fifth message format includes at least one of the following fields: a random access preamble identity (RAPID), a TA, uplink scheduling information, a temporary cell-radio network temporary identifier (temporary C-RNTI), and a backoff indication. Optionally, the random access response in the fifth message format may further include a format field. The format field in the random access response in the fifth message format is used to indicate that a message format of the random access response in which the format field is located is the fifth message format.

A random access response in the sixth message format includes at least one of the following fields: an RAPID and a backoff indication. Optionally, the random access response in the sixth message format may further include a format field. The format field in the random access response in the sixth message format is used to indicate that a message format of the random access response in which the format field is located is the sixth message format.

Meanings of the fields in the foregoing message formats are as follows.

The TA is a timing advance. After receiving this field, the terminal device adjusts/updates an uplink signal sending occasion based on a value in the field, to complete uplink synchronization. The terminal may further set a timer, and uplink synchronization is valid before the timer expires.

C-RNTI: This identifier is an air interface identifier of a terminal device in the connected state. The terminal identifies, based on the identifier, a physical layer control signal sent by the network device to the terminal.

Temporary C-RNTI: This identifier is an identifier temporarily allocated in a random access procedure. The temporary C-RNTI is used by the terminal device and the network device to receive and send Msg3 and Msg4 in the random access procedure.

Backoff indication (BI): After the terminal device receives this indication, if random access fails this time, the terminal device first backs off for a period of time and then initiates next random access, and a backoff time is randomly selected within a specific range. A maximum value of the range is indicated by the BI or determined based on the BI.

UL-Grant: Uplink scheduling information. The network device schedules an uplink resource for the terminal device to send a Msg3 message in an existing random access procedure, and configures a related parameter used for uplink sending. The Msg3 message includes fields such as a user identity, an authentication identifier, and an access reason. The parameter used for uplink sending includes an MCS, uplink pilot parameter configuration, and the like.

The RAPID is used to identify a random access preamble sequence. Various field information in the foregoing message formats and optional downlink user data may be transmitted as a same transport block (transport block, TB). The foregoing field information may be transmitted as control information of the layer 2, such as, a media access control control element (MAC CE) or a MAC sub-header, or may be transmitted as control information of the layer 3, such as, an RRC message, or some field information may be transmitted as control information of the layer 2, and the other field information may be transmitted as control information of the layer 3. The downlink user data may be a data unit encapsulated by using an upper layer, and the upper layer means a PDCP sublayer and an RLC sublayer.

The network device sends the random access response to the terminal device in a determined message format.

After sending a random access request, the terminal device needs to wait to receive a random access response of the network device. Specifically, in a time window specified by downlink control information of the network device, the terminal device monitors a downlink physical control channel by using a corresponding RA-RNTI. If the terminal device receives DCI identified by the RA-RNTI, the terminal device decodes a random access response at a time-frequency location indicated by the DCI, in other words, receives the random access response, and then continues a subsequent process. The physical downlink control channel may include a plurality of pieces of DCI. If a specific piece of DCI that the random access response is for needs to be found, the terminal device descrambles decoded DCI by using the RA-RNTI. If the descrambling succeeds, it is considered that the current DCI is for the random access response, and a random access response corresponding to the current DCI is received based on the DCI.

After receiving the random access response, the terminal device may determine, based on the message format of the random access response, a to-be-performed state transition AND/OR operation corresponding to the message format, and perform the state transition AND/OR operation corresponding to the message format. For example, for the six message formats in the foregoing example, the terminal device correspondingly performs the following state transition AND/OR operations separately.

The terminal device switches to the connected state based on the random access response in the first message format, and data corresponding to the random access response in the first message format is successfully sent.

The terminal device maintains the inactive state and adjusts uplink timing based on the random access response in the second message format, and data corresponding to the random access response in the second message format is successfully sent.

The terminal device maintains the inactive state based on the random access response in the third message format, and data corresponding to the random access response in the third message format is successfully sent.

The terminal device maintains the inactive state or switches to the idle state based on the random access response in the fourth message format, and data corresponding to the random access response in the fourth message format fails to be sent.

The terminal device sends a radio resource control RRC connection request to the network device based on the random access response in the fifth message format, and data corresponding to the random access response in the fifth message format fails to be sent, where the RRC connection request may be an RRC connection request sent in a third step in a random access procedure in the prior art.

The terminal device resends the random access request to the network device based on the random access response in the sixth message format, and data corresponding to the random access response in the sixth message format fails to be sent.

It can be learned from the foregoing descriptions that after receiving random access responses in some message formats, the terminal device may switch to the connected state, or maintain the inactive state, but may continue to send the user data, or maintains the inactive state or re-initiates a random access request. Compared with the prior art, processing time of a subsequent procedure is performed in advance, thereby shortening duration occupied by an entire random access procedure and data sending.

In an embodiment, processing performed after the terminal device receives the random access responses in the various formats further includes the following.

a. For the random access response in the first message format the terminal device determines whether a received connection identifier matches the connection identifier in the random access request sent by the terminal device, and if the connection identifiers match, the terminal device determines that this message is sent to the terminal device, or otherwise, the terminal device discards this message.

The terminal device adjusts an uplink signal sending occasion based on the TA, to complete uplink synchronization.

If the random access response in the first message format includes an RRC message, the terminal device configures a data radio bearer based on the RRC message.

The terminal device monitors, based on the C-RNTI in the random access response, control information (scheduling information) sent by the network device to the terminal device. Further, the terminal device maintains the connected state.

b. For the random access response in the second message format the terminal device determines whether a received connection identifier matches the connection identifier in the random access request sent by the terminal device, and if the connection identifiers match, the terminal device determines that this message is sent to the terminal device, or otherwise, the terminal device discards this message.

The terminal device adjusts an uplink signal sending occasion based on the TA, to complete uplink synchronization.

c. For the random access response in the third message format the terminal device determines whether a received connection identifier matches the connection identifier in the random access request sent by the terminal device, and if the connection identifiers match, the terminal device determines that this message is sent to the terminal device, or otherwise, the terminal device discards this message.

d. For the random access response in the fourth message format the terminal device determines whether a received connection identifier matches the connection identifier in the random access request sent by the terminal device, and if the connection identifiers match, the terminal device determines that this message is sent to the terminal device, or otherwise, the terminal device discards this message.

The terminal device maintains the inactive state or switches to the idle state based on an indication of the RRC reject field.

e. For the random access response in the fifth message format the terminal device determines whether a received RAPID matches the RAPID in the random access request sent by the terminal device, and if the RAPIDs match, the terminal device determines that this message is sent to the terminal device, or otherwise, the terminal device discards this message.

The terminal device adjusts an uplink signal sending occasion based on the TA, to complete uplink synchronization.

The terminal device sends a Msg3 message based on an uplink resource allocated by the UL-Grant, where the Msg3 includes a field such as the user identifier or the authentication identifier.

f. For the random access response in the sixth message format the terminal device determines whether a received RAPID matches the RAPID in the random access request sent by the terminal device, and if the RAPIDs match, the terminal device determines that this message is sent to the terminal device, or otherwise, the terminal device discards this message.

In the prior art, a process of sending msg1 to msg4 between the terminal device and the network device may be referred to as a four-step random access procedure (4-step random access procedure, 4-Step RA Procedure), and a process of sending the random access request and the random access response in this application between the terminal device and the network device may be referred to as a two-step random access procedure (2-step RA Procedure). In LTE, a random access request carries only a preamble, and random access can be completed only after a 4-step RA procedure, to obtain a random access parameter for setting up an RRC connection. The random access request in this application carries the preamble, the control information, and the user data, and the control information includes the connection identifier and the authentication identifier. A signaling bearer may be set up based on the connection identifier and the authentication identifier, thereby ensuring implementation of data communication between the terminal device and a network side.

According to the communication method provided in this embodiment, the terminal device in the inactive state adds the connection identifier and the authentication identifier to the random access request, so that implementation of data communication between the terminal device and the network side is ensured. If the network device does not obtain the connection identifier or the authentication identifier, the network device cannot know a sender of the user data in the random access request, and discards the user data. In this case, current data communication initiated by the terminal device in the inactive state is invalid data communication, in other words, data communication between the terminal device and the network device fails.

Figure 5:
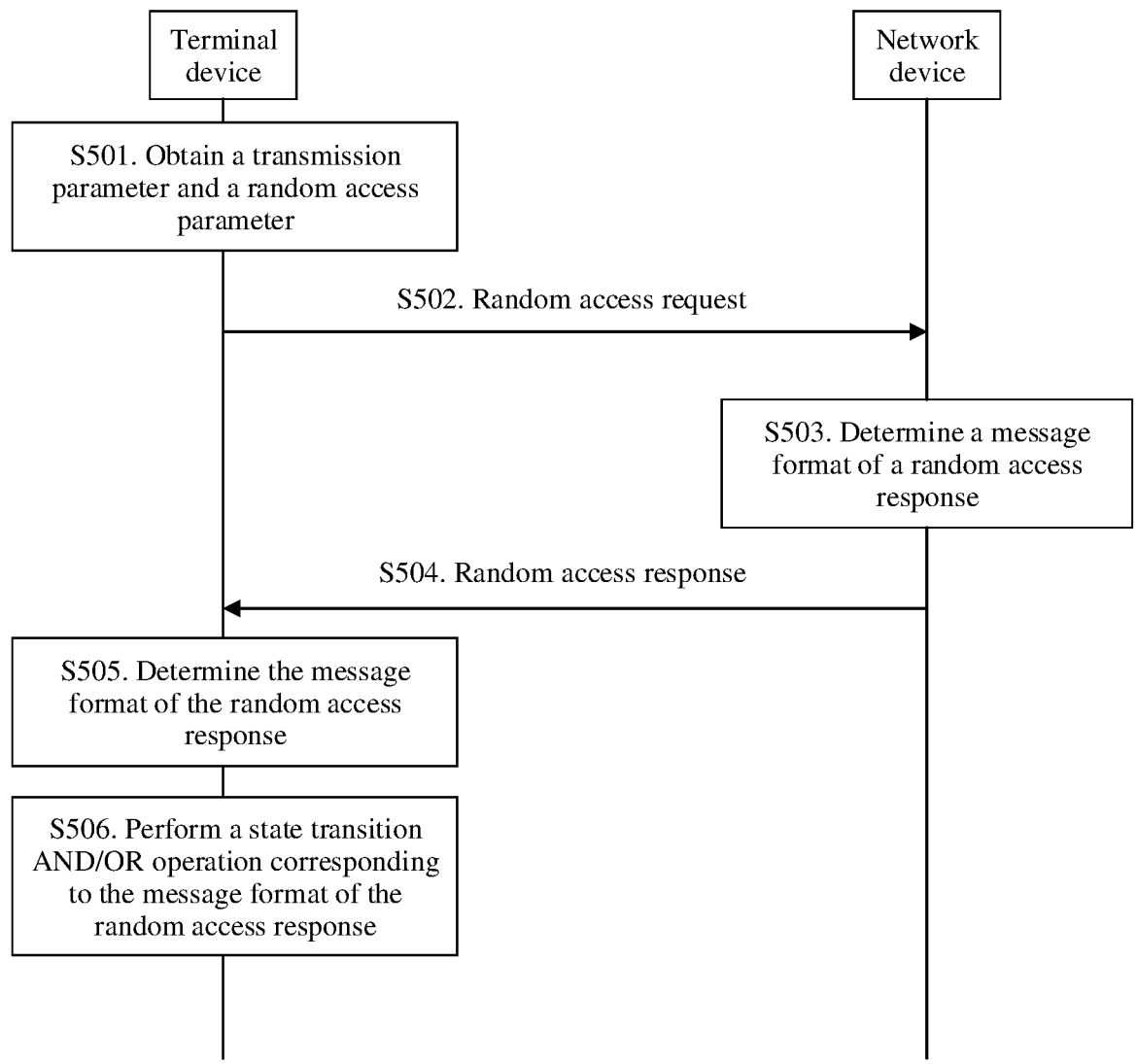
FIG. 5 is a schematic interaction flowchart of another communication method according to an embodiment.

FIG. 5 is a schematic interaction flowchart of another communication method according to an embodiment. The method may include the following steps.

S501. A terminal device obtains a transmission parameter and a random access parameter.

S502. The terminal device sends a random access request to a network device.

S503. The network device receives the random access request sent by the terminal device, and determines a message format of a random access response.

S504. The network device sends the random access response to the terminal device.

S505. The terminal device receives the random access response sent by the network device, and determines the message format of the random access response.

S506. The terminal device performs a state transition AND/OR operation corresponding to the message format of the random access response.

In this application, the network device may further configure, for a terminal device in an inactive state, a parameter used to perform a random access procedure (2-step RA procedure and/or 4-step RA procedure). For example, the network device configures, for the terminal device, a parameter used to send/receive msg1 to msg4. Specifically, a transmission parameter used to transmit the control information and the user data needs to be preconfigured, and a random access parameter may also need to be preconfigured.

The transmission parameter includes at least one of the following parameters: a time-frequency resource used to transmit the control information and the user data, a modulation and coding scheme parameter, an encryption parameter, a cyclic prefix length, and a reference signal parameter. The random access parameter includes at least one of the following parameters: a random access preamble sequence generation parameter and a corresponding time-frequency resource, a random access response receive window parameter, a beam-related parameter, a random access preamble sequence subset division manner, and a backoff parameter. Certainly, another parameter may also be included. The reference signal parameter may be a demodulation reference signal (DMRS) parameter or a terminal device-specific reference signal (UE-specific RS) parameter.

Specifically, before the terminal device sends/receives the msg1 to the msg4, the parameter for sending/receiving the msg1 to the msg4 needs to be configured. Parameter content that needs to be preconfigured includes but is not limited to the following.

(1) A preamble sequence generation parameter in a random access procedure and a time-frequency resource occupied by the preamble are configured.

In an implementation, the random access procedure may be divided into a 2-step RA procedure and a 4-step RA procedure, and a preamble sequence generation parameter (or sequence) used in the 2-step RA procedure and the 4-step RA procedure and an occupied time-frequency resource may be configured. Herein, the time-frequency resource occupied by the preamble may be divided into a time-frequency resource occupied by a preamble in the 2-step RA procedure and a time-frequency resource occupied by a preamble in the 4-step RA procedure. When the preamble sequence generation parameter and the occupied time-frequency resource are configured, the time-frequency resource occupied by the preamble in the 2-step RA procedure and the time-frequency resource occupied by the preamble in the 4-step RA procedure may or may not share a time-frequency resource. The following three configuration manners are included.

Manner 1: A time-frequency resource is shared, and preamble sequences of two RA procedure types are distinguished. Different preamble sequence sets are configured for the 2-step RA procedure and the 4-step RA procedure. The network device determines, based on a preamble sequence, a type of RA procedure initiated by the terminal device.

Manner 2: A time-frequency resource is shared, and preamble sequences of two RA procedure types are not distinguished. A same preamble sequence set is configured for the 2-step RA procedure and the 4-step RA procedure. The network device determines, based on whether the user data can be decoded, whether the terminal device initiates the 2-step RA procedure.

Manner 3: A time-frequency resource is not shared. In this manner, the time-frequency resource occupied by the preamble in the 2-step RA procedure is different from the time-frequency resource occupied by the preamble in the 4-step RA procedure. The network device may determine, based on a time-frequency resource location of the preamble, a type of RA procedure initiated by the terminal device. In this manner, the 2-step RA procedure and the 4-step RA procedure may use a same preamble sequence set, or may use different preamble sequence sets. In this manner, the preamble in the 2-step RA procedure is not interfered with by the preamble in the 4-step RA procedure, and the preamble in the 4-step RA procedure is not interfered with by the preamble in the 2-step RA procedure. Therefore, access reliability can be improved, and accuracy of channel estimation performed by using the preamble can also be improved.

The network device parses the currently received random access request based on the type of the random access procedure identified in the foregoing manner. For example, when the identified type of the random access procedure is the 2-step RA procedure, the random access request is parsed based on the format shown in Table 1, and then a subsequent procedure in the 2-step RA procedure is performed. When the identified type of the random access procedure is the 4-step RA procedure, the current random access request is parsed based on a format of msg1 in the prior art, and then a subsequent procedure in the 4-step RA procedure is performed.

(2) A time-frequency resource used to transmit the control information and the user data is configured.

(3) If the terminal device implicitly includes indication information by selecting a preamble sequence subset (for example, implicitly indicates, by selecting a sequence, whether to switch to the connected state), a preamble sequence subset division manner may be further configured. Specifically, the network device configures a preamble sequence resource of an RA procedure through broadcasting. For example, there are 64 available preamble sequences p1 to p64 in total in a current cell. The 64 preamble sequences are divided into two subsets, where a subset 1 includes p1 to p32, and a subset 2 includes p33 to p64. When the terminal device is in the inactive state, and the terminal device expects to switch to the connected state after current sending (for example, the terminal device further needs to send data subsequently), a preamble sequence in the subset 1 is selected for sending. After detecting that a current preamble sequence is a sequence in the subset 1 and successfully decoding current data, the network device performs determining based on a load status of a current network. If a relatively small quantity of users are connected to the current network, the terminal device is allowed to switch to the connected state after current transmission ends, in other words, the terminal device feeds back a format 1. When the terminal device is in the inactive state, and the terminal device expects to maintain the inactive state after current sending (for example, the terminal device does not need to send data subsequently, and expects to maintain low power consumption), a preamble sequence in the subset 2 is selected for sending. After detecting that a current preamble sequence is a preamble sequence in the subset 2 and successfully decoding current data, the network device feeds back a random access response whose message format is a format 2 or a random access response whose message format is a format 3.

(4) A parameter related to backoff is configured. After access fails, the terminal device does not immediately re-initiate an RA procedure, but waits for a period of time. The time is randomly selected from 0 to backoff.

(5) A modulation and coding scheme parameter is configured. For example, a modulation and coding scheme (MCS) is configured. In a case of non-orthogonal transmission, information such as a codebook may be further configured. If data can be repeatedly sent, a repetition quantity K is further included.

(6) A random access response window (RAR Window) parameter is configured. After the terminal device sends the random access request, the network device sends the random access response within a specific time. The time is referred to as an RA response window. Correspondingly, the terminal device monitors msg2 only in the time window.

(7) Related parameters of a plurality of beams are configured.

For a transmission parameter used to transmit the user data (and/or the control information), particularly, parameter content that needs to be preconfigured includes but is not limited to the following.

(8) A cyclic prefix (CP) used for transmitting the user data is configured. The terminal device may be configured to use an extended cyclic prefix (CP) (if the terminal device uses the extended CP, the network device may use any receiver to receive the random access request). The terminal device may also be configured to use a normal CP (if the terminal device uses the normal CP, the network device receives the random access request by using an SIC receiver).

(9) A time-frequency resource used to transmit the user data is configured to be adjacent to a time-frequency resource occupied by the preamble (in this way, the preamble may be used to assist channel estimation) or to be not adjacent to a time-frequency resource occupied by the preamble (in this way, configuration is flexible). When the time-frequency resource used to transmit the user data and the time-frequency resource occupied by the preamble are configured at adjacent time-frequency resource locations, the preamble may be used as a DMRS, so that the terminal device may be configured to not send the DMRS when sending the user data to the network device.

(10) An encryption parameter of the user data is configured. The encryption parameter may be configured when the terminal device switches from the connected state to the inactive state. For example, the parameter is configured when the terminal device completes tracking area update (tracking area update, TAU) or radio access network-based area update (RAN based area update). Specifically, the parameter may be configured by using a radio resource control connection suspend (RRC connection suspend) message or a radio resource control connection release (RRC connection release) message. The encryption parameter may be an NCC (nextHopChainingCount).

(11) A quantity of times of repeatedly transmitting the control information and the user data as a whole is configured.

(12) A scrambling parameter of the user data is configured. For example, a generation parameter of a scrambling sequence of a user data part may include a sequence number of the preamble.

The foregoing parameters are mainly preconfigured in the following three manners, but are not limited thereto.

(1) The network device configures the parameters for the terminal device through broadcasting.

After entering the inactive state, the terminal device needs to monitor a radio access network-based paging (RAN-initiated paging) message and a core network-based paging (CN-based paging) message based on a preset period. Therefore, the terminal device can monitor a broadcast message of the network device. The network device adds the foregoing preconfigured parameters to the broadcast message.

(2) When the terminal device switches from the connected state to the inactive state, the network device configures the parameters by using an RRC message, for example, an RRC connection suspend message or an RRC connection release message.

(3) A system preconfigures the parameters, for example, specifications in a related standard or protocol may be followed.

In an implementation, parameters for transmitting the preamble sequence generation parameter and the occupied time-frequency resource may be configured in the manner (1), and a transmission parameter for transmitting the control information and the user data and the random access parameter may be configured in the manner (2). When the transmission parameter and the random access parameter are configured, all the parameters listed above may be configured, or some of the parameters may be configured.

It should be noted that, in S501, the terminal device may obtain the transmission parameter and the random access parameter at a same time, or the terminal device may separately obtain the transmission parameter and the random access parameter.

After the terminal device obtains the transmission parameter and the random access parameter, S502 is specifically that the terminal device sends the control information and the user data in the random access request by using the transmission parameter, or S502 is specifically that the terminal device sends the random access request by using the transmission parameter and the random access parameter.

The terminal device may send the random access request by using one or more beams, and content of random access requests sent by using all the beams may be the same. Different beams correspond to different time-frequency resources.

After receiving the random access request sent by the terminal device, the network device detects the preamble in the random access request, and decodes and/or parses the control information and the user data. The network device needs to indicate a state transition and/or operation of the terminal device based on one or more of a detection result of the preamble, a decoding and parsing result of the control information and the user data, and a current network status. Therefore, the network device needs to determine the message format of the random access response. Specifically, the network device determines the message format of the random access response based on at least one of the following factors: the detection result of the random access preamble, the decoding and parsing result of the control information and the user data, and the current network status.

If the network device successfully detects the preamble and successfully decodes and parses the control information and the user data, the network device determines, based on whether the random access request includes information indicating a switch-to-the-connected-state request, the current network status, and/or whether the network device has a downlink data transmission requirement for the terminal device, whether the terminal device switches to the connected state, and sends a random access response in a corresponding message format.

When a value of a switch-to-the-connected-state request field in the control information indicates that the terminal device requests to switch to the connected state, or a switch-to-the-connected-state request field in the control information (if the control information does not include the "switch-to-the-connected-state request field", it is considered that the terminal device does not request to switch to the connected state) or a preamble sequence implicitly indicates that the terminal device requests to switch to the connected state, it is considered that the terminal device requests to switch to the connected state. If a value of a switch-to-the-connected-state request field in the control information does not indicate that the terminal device requests to switch to the connected state, and the preamble sequence does not indicate that the terminal device requests to switch to the connected state, it is considered that the terminal device does not need to switch to the connected state. If the random access request does not include a switch-to-the-connected-state request field, and the preamble sequence does not indicate that the terminal device requests to switch to the connected state, it is also considered that the terminal device does not need to switch to the connected state. In this embodiment, when the terminal device requests to switch to the connected state, it may be considered that the terminal device may still need to send uplink user data. When the terminal device does not need to switch to the connected state, it may be considered that the terminal device does not need to transmit uplink data subsequently.

When the network device considers that the terminal device still needs to send uplink user data and/or that the network device has a downlink data transmission requirement for the terminal device, the network device may send the random access response in the first message format, so that the terminal device switches to the connected state to complete subsequent data transmission. In an embodiment, for whether to send the random access response in the first message format, further refer to the current network status to determine whether to send the random access response in the first message format. For example, the random access response in the first message format is sent to the terminal device only when a network status is good (for example, a relatively small quantity of terminal devices access a network currently, or a current network load status is low, or there are still sufficient available resources in a network). In another embodiment, the network device may directly send the random access response in the first message format to the terminal device provided that a current network status is good. In this application, in addition to indicating that the network device instructs (or allows) the terminal device to switch to the connected state, the random access response in the first message format may further indicate that the user data in the random access request has been correctly received by the network device.

If the network device successfully detects the preamble and successfully decodes and parses the control information and the user data, and the network device considers that the terminal device may still need to transmit uplink user data, but due to a network resource shortage, the network device sends the random access response in the second message format to instruct the terminal device to maintain the inactive state and adjust uplink timing. In this application, the random access response in the second message format may further indicate that the user data in the random access request has been correctly received by the network device.

If the network device successfully detects the preamble and successfully decodes and parses the control information and the user data, and the network device considers that the terminal device subsequently has no to-be-transmitted user data, the network device sends the random access response in the third message format to instruct the terminal device to maintain the inactive state. In this application, the random access response in the third message format may further indicate that the user data in the random access request has been correctly received by the network device.

If the network device successfully detects the preamble and successfully decodes and parses the control information, and the network device forbids access of the terminal device out of consideration of a current network status (for example, a quantity of terminal devices that currently access a network, a load, or a network resource), or the network device fails to obtain context information of the terminal device based on the connection identifier, the network device sends the random access response in the fourth message format, to instruct the terminal device to maintain the inactive state or switch to the idle state. In this application, the random access response in the fourth message format may further indicate that the user data fails to be transmitted.

If the network device successfully detects the preamble but fails to perform decoding, the network device sends the random access response in the fifth message format, to instruct the terminal device to send an RRC connection request to the network device. In this application, the random access response in the fifth message format may further indicate that the user data fails to be transmitted.

If the network device successfully detects the preamble but fails to perform decoding, the network device sends the random access response in the sixth message format, to instruct the terminal device to resend the random access request to the network device. In this application, the random access response in the sixth message format may further indicate that the user data fails to be transmitted.

Then, the network device sends the random access response to the terminal device in the determined message format, and the network device indicates the message format of the random access response in at least one of the following manners.

Specifically, in an implementation, the random access response includes a message format field, and the message format field is used to indicate the message format of the random access response, and the terminal device determines the message format of the random access response based on the message format field in the random access response. As shown in a message format of the random access response shown in FIG. 6a, a random access response in each message format includes a format field, and the field indicates the message format of the random access response. In this manner, the message format of the random access response may be clearly indicated. Specifically, for a location of the format field, in an implementation, the format field is located in a first field in the random access response, and the first field is a first field that is read in the random access response, and in another implementation, the format field is located at a predetermined location of the random access response.

Figure 6B:
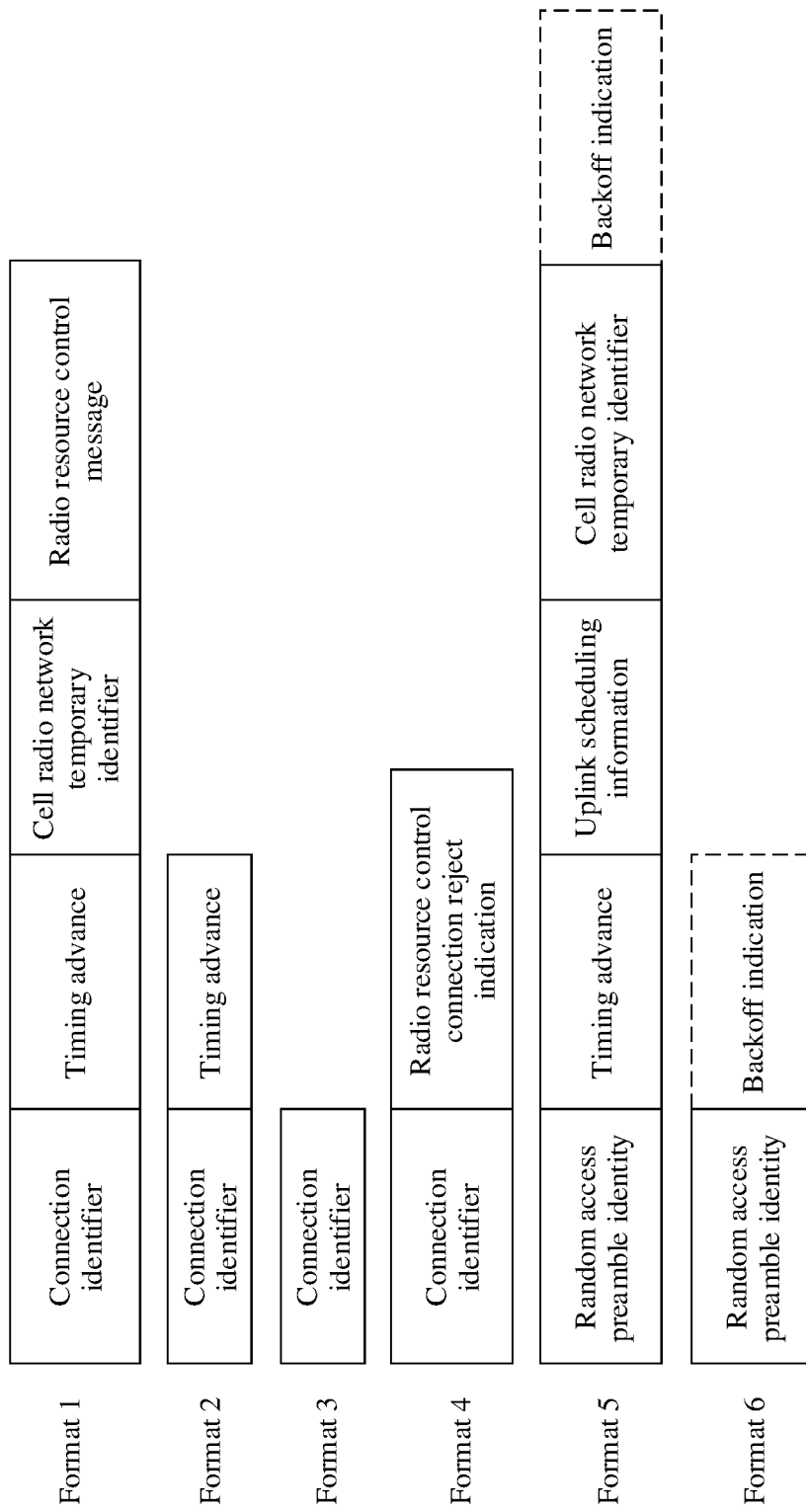

In another implementation, the network device further sends downlink control information DCI corresponding to the random access response, where the downlink control information includes a time-frequency resource and a modulation and coding scheme that are corresponding to the random access response, the time-frequency resource and the modulation and coding scheme are used to determine a transport block size (TBS) corresponding to the random access response, and each transport block size corresponds to one message format, the terminal device obtains the transport block size corresponding to the random access response, and the terminal device determines the message format of the random access response based on the transport block size, where each message format of the random access response corresponds to one transport block size, and different message formats correspond to different transport block sizes. FIG. 6b is a schematic diagram of another message format of the random access response. In FIG. 6b, none of message formats includes a format field, and the message format of the random access response is indicated by using a transport block size of the random access response. Specifically, CRC of DCI corresponding to the random access response is scrambled by using an RA-RNTI, and the RA-RNTI may be calculated by using a time-frequency resource occupied by a preamble of msg1. The DCI includes information about a time-frequency resource used to transmit the random access response, and a corresponding MCS. The terminal device may calculate, based on the time-frequency resource and the MCS, a TBS corresponding to the random access response. The TBS has a one-to-one correspondence with various formats. Therefore, a format of the random access response may be indicated by using the DCI. In this manner, the DCI does not need to be changed, and a quantity of blind detection times of the DCI does not need to be increased.

In still another implementation, the DCI includes message format information of the random access response. The terminal device receives DCI corresponding to the random access response, where the DCI carries the message format information of the random access response, and the terminal device determines the message format of the random access response based on the DCI. FIG. 6c shows still another message format of the random access response. A field of the random access response does not include a format field, but DCI includes a format field. In this manner, the message format of the random access response may be clearly indicated. In this implementation, as described in FIG. 6c, the random access response may include downlink data.

In still another implementation, the terminal device determines the message format of the random access response based on a RAR response window in which the terminal device receives the random access response, where each message format of the random access response corresponds to one RAR response window, and different message formats correspond to different RAR response windows. Specifically, the network device sends the random access response in different RAR response windows (or timeslots), and different RAR response windows correspond to different message formats. In this manner, signaling overheads are small.

The terminal device receives the random access response sent by the network device, and determines the message format of the random access response in any one of the foregoing manners. Each message format corresponds to one state transition AND/OR operation.

The following describes in detail the random access procedure and the state transition AND/OR operation of the terminal device by using a specific example.

Figure 7A:
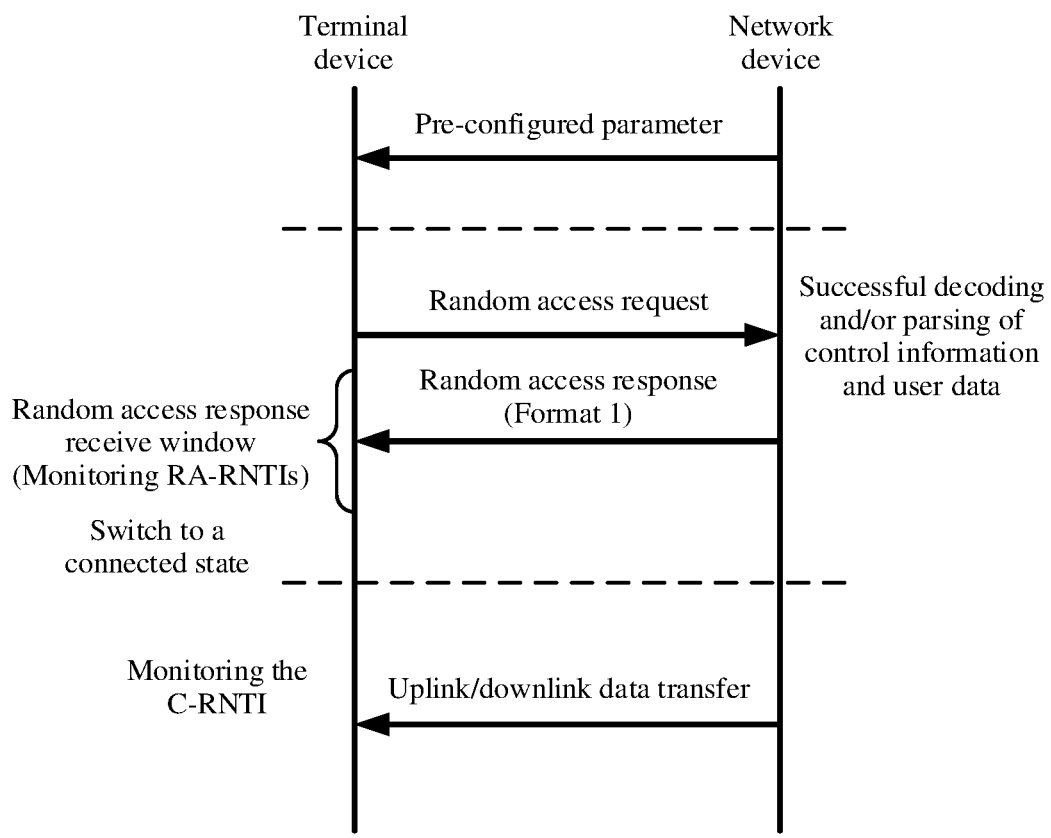
FIG. 7a to FIG. 7e are schematic interaction flowcharts of a random access procedure in specific examples.

In an implementation, the terminal device sends the random access request on one set of time-frequency resources. FIG. 7a is a schematic interaction flowchart of a random access procedure in a specific example. The network device preconfigures the transmission parameter and the random access parameter. The terminal device is in the inactive state.

When the terminal device needs to send data, the terminal device sends the random access request on one set of time-frequency resources. The random access request includes a preamble, a connection identifier, an authentication identifier, and user data, and may further include a switch-to-the-connected-state request and a data transmission reason. The one set of time-frequency resources is a time-frequency resource for sending the preamble, and a time-frequency resource for sending the control information and the user data.

The network device detects the preamble on a time-frequency resource of the random access request, and the network device decodes and/or parses the control information and the user data.

The network device may determine, based on whether the random access request includes a switch-to-the-connected-state request field, a value of the switch-to-the-connected-state request field, an implicit indication of the preamble sequence, or a current network status, that the network device needs to instruct the terminal device to switch to the connected state, and the network device predicts, based on at least one piece of information in the switch-to-the-connected-state request, whether the terminal device has a downlink service requirement, and the current network load status, that the terminal device still needs to transmit the user data, and the network device determines that the message format of the random access response is the format 1. The network device sends a random access response in the format 1 by using a PDSCH, in other words, sends a random access response that includes fields such as a connection identifier, a TA, a C-RNTI, and an RRC message. CRC of corresponding DCI is scrambled by using an RA-RNTI, and the RA-RNTI is calculated based on a time-frequency resource of the random access request. In the random access response, the connection identifier is the same as the connection identifier included in the random access request received by the network device.

If the terminal device receives the DCI identified by the RA-RNTI, the terminal device decodes the random access response at a time-frequency resource location indicated by the DCI, in other words, receives the random access response.

The terminal device identifies the message format of the received random access response in any one of the foregoing indication manners of the message format of the random access response, and performs a state transition AND/OR operation corresponding to the identified message format. Further, the random access response is parsed based on the identified message format, to obtain content included in the random access response.

For example, if it is identified that the message format of the received random access response is the format 1, the terminal device switches to the connected state.

If the terminal device does not receive the random access response in the RA response window, the terminal device maintains the inactive state, and re-initiates a random access procedure to perform data retransmission.

In another implementation, the terminal device sends a plurality of random access requests. Different from the foregoing implementation, the terminal device sends the random access requests on a plurality of sets of time-frequency resources, in other words, sends the plurality of random access requests on a plurality of beams, and each beam corresponds to one set of time-frequency resources. The network device detects the preamble on the plurality of sets of time-frequency resources. If the preamble is detected on the plurality of sets of time-frequency resources, the network device separately decodes subsequent user data. If decoding succeeds on the plurality of sets of time-frequency resources and corresponding connection identifiers are the same, only user data on a time-frequency resource with a strongest signal is reserved, and the user data is sent to a higher layer of a protocol stack. In other words, the receiving, by a network device, a random access request sent by a terminal device includes receiving, by the network device, a plurality of random access requests separately sent by the terminal device by using a plurality of beams. The method further includes selecting, by the network device, one random access request from the plurality of random access requests based on a specified signal quality condition. The sending, by the network device, the random access response to the terminal device includes sending, by the network device, the random access response corresponding to the selected random access request.

Figure 7B:
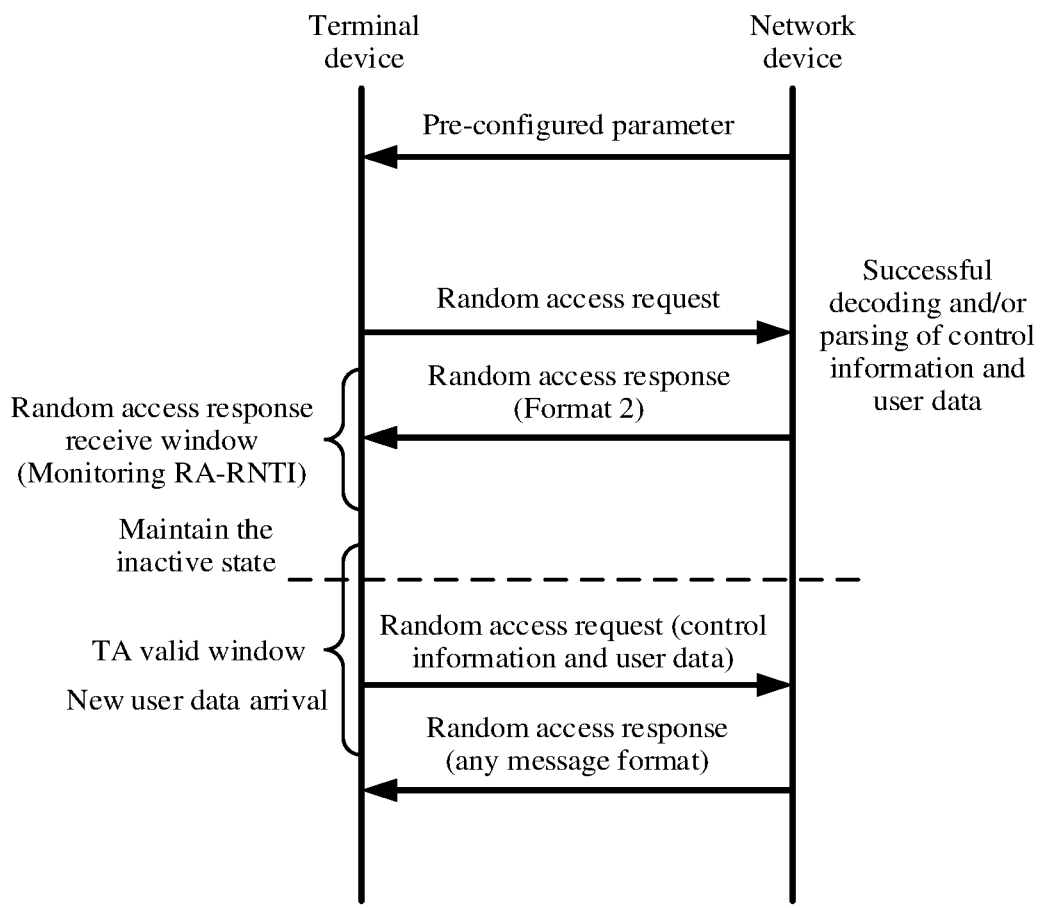

In another implementation, FIG. 7b is a schematic interaction flowchart of a random access procedure in another specific example.

The network device predicts, based on at least one piece of information in the switch-to-the-connected-state request, whether the terminal device has a downlink service requirement, and a current network load status, that the terminal device still needs to transmit user data, but due to a resource shortage, the network device does not want the terminal device to switch to the connected state. The network device sends a random access response in a format 2 by using a PDSCH, where the random access response includes fields such as a connection identifier and a TA. In the random access response, the connection identifier is the same as the connection identifier included in the random access request received by the network device.

After determining, in any one of the foregoing indication manners of the message format of the random access response, that the message format of the received random access response is the format 2, the terminal device maintains the inactive state. Further, the TA may be adjusted based on a TA indicated by a TA field in the format 2, and a valid timer of the TA is set. Within a validity period of the TA, if the terminal device still needs to send user data, the terminal device may directly send the random access request in the format shown in Table 2, and does not need to send the preamble again.

The network device also sets a corresponding TA valid timer. Within a validity period of the TA, the network device also detects, in a time-frequency resource area that is preconfigured for the terminal device and that is used to transmit the random access request in the format shown in Table 2, the random access request sent by the terminal device, and performs demodulation and decoding.

Figure 7C:
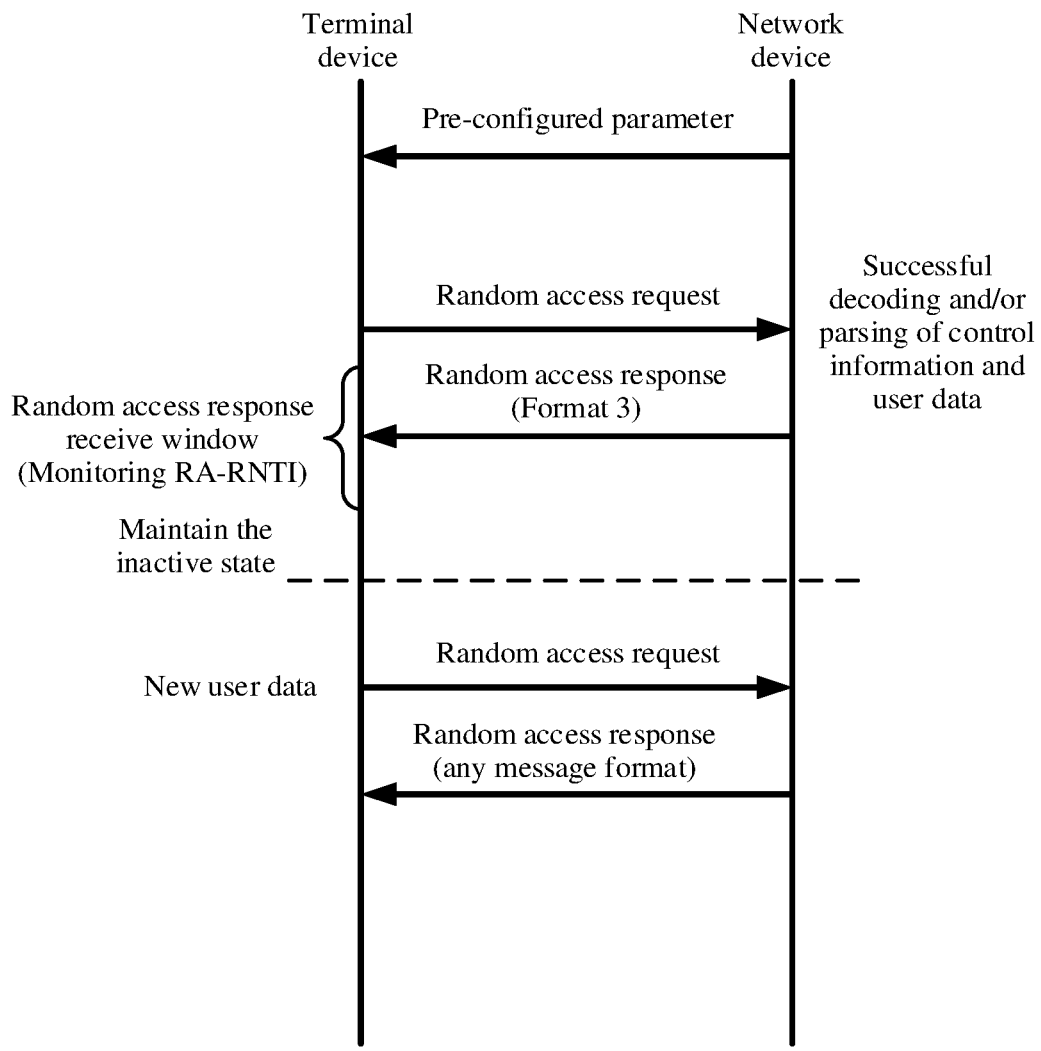

In still another implementation, FIG. 7c is a schematic interaction flowchart of a random access procedure in still another specific example.

If the network device predicts, based on at least one piece of information in the switch-to-the-connected-state request, whether the terminal device has a downlink service requirement, and a current network load status, that the terminal device subsequently does not have to-be-transmitted user data, the network device sends a random access response in a format 3, where the random access response includes a field such as a connection identifier. In the random access response, the connection identifier is the same as the connection identifier included in the random access request received by the network device.

After determining, in any one of the foregoing indication manners of the message format of the random access response, that the message format of the received random access response is the format 3, the terminal device maintains the inactive state.

When the terminal device determines that the message format of the random access response received by the terminal device is any one of the format 1, the format 2, and the format 3, the terminal device considers that uplink user data sent by the terminal device is successfully received by the network device, so that uplink user data (the uplink user data is user data sent by using the random access request) in a cache may be cleared.

Figure 7D:
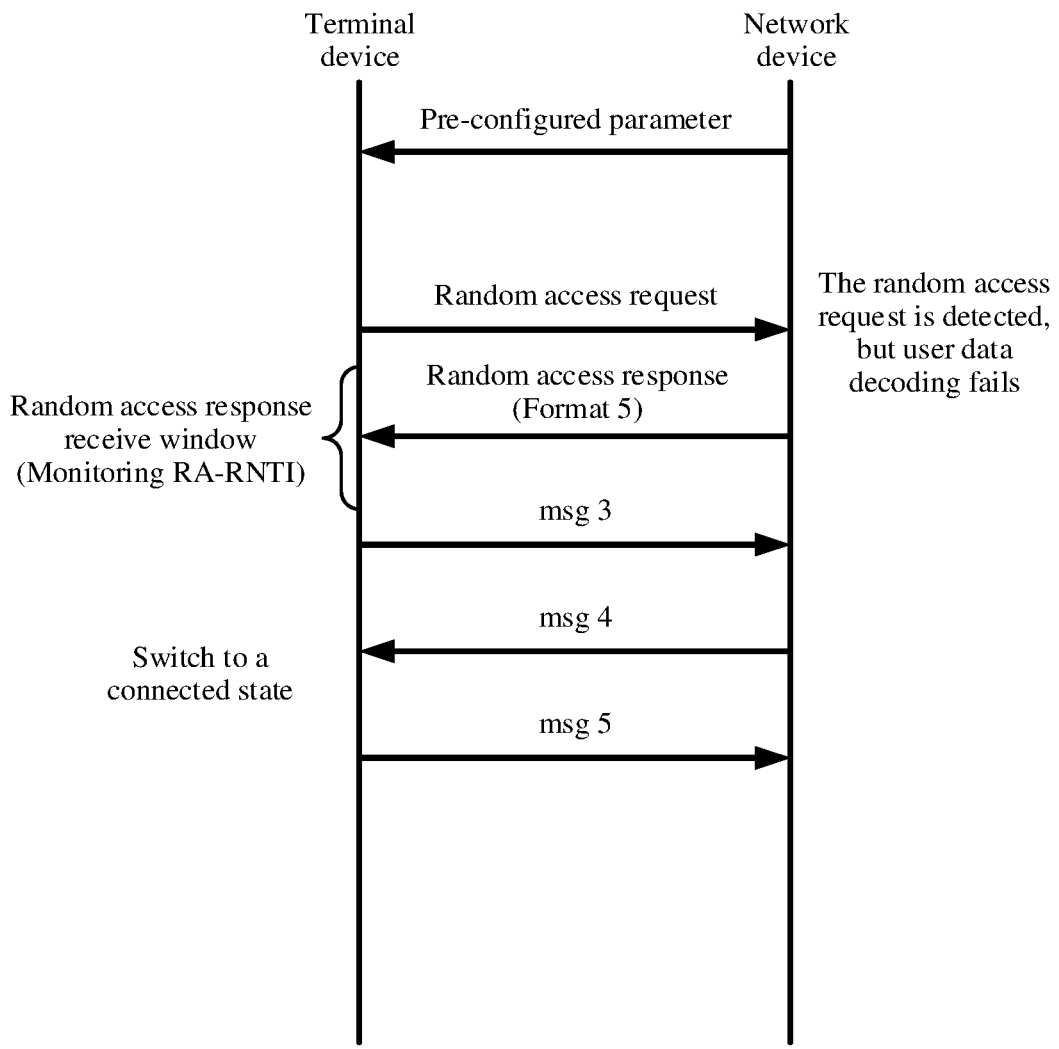

In still another implementation, FIG. 7d is a schematic interaction flowchart of a random access procedure in still another specific example.

The network device detects the preamble, but decoding fails (if a same preamble is detected on a plurality of time-frequency resources, and decoding fails, user data and control information on a time-frequency resource with a strongest signal are decoded), the network device feeds back a random access response in a format 5. The random access response includes field information such as an RAPID, a TA, uplink scheduling information, a TC-RNTI, and a backoff indication (optional). In the random access response, the RAPID is the same as an RAPID included in the random access request received by the network device.

After determining, in any one of the foregoing indication manners of the message format of the random access response, that the message format of the received random access response is the format 5, the terminal device proceeds to a third step in an existing 4-step RA procedure of sending an RRC connection request (msg3).

Figure 7E:
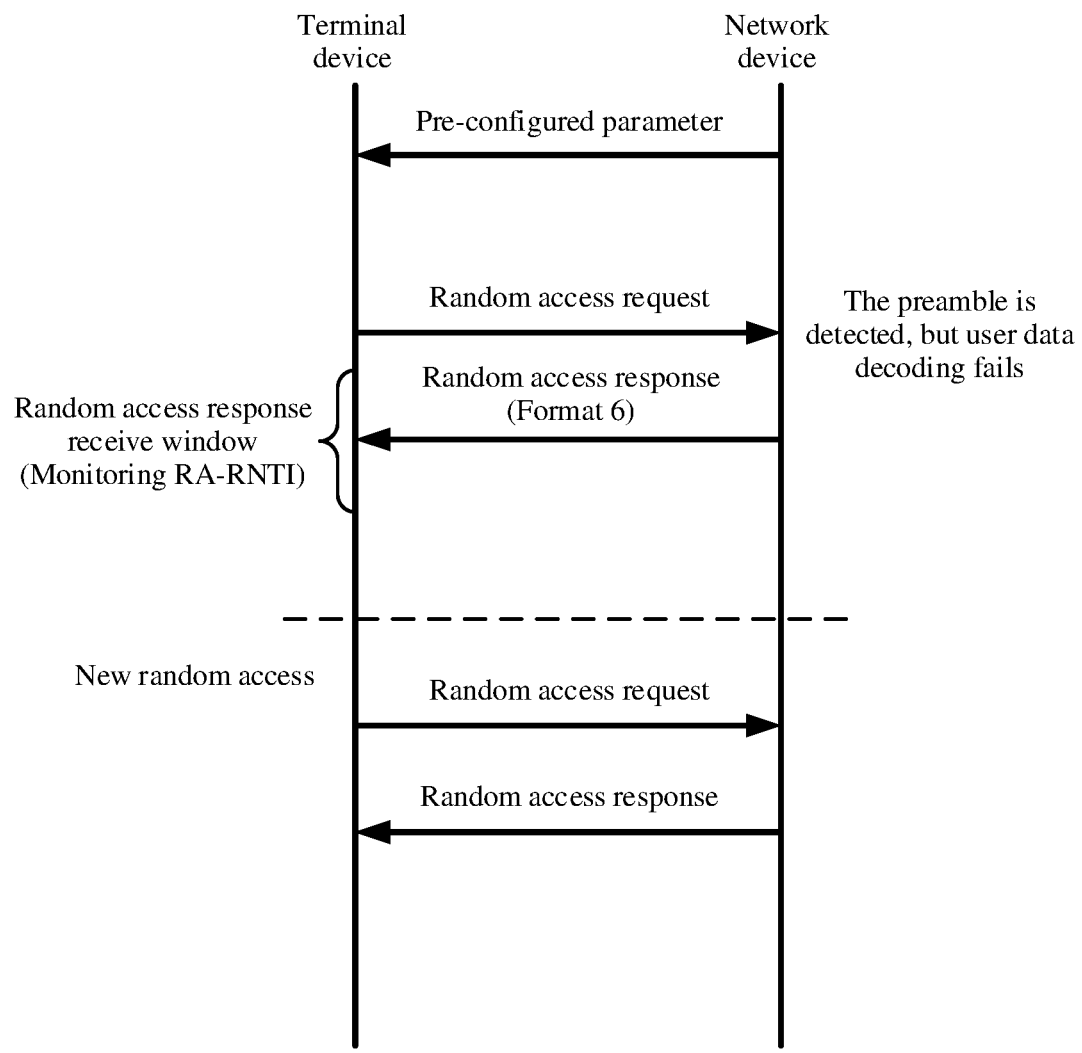

In still another implementation, FIG. 7e is a schematic interaction flowchart of a random access procedure in still another specific example.

The network device detects the preamble, but decoding fails (if a same preamble is detected on a plurality of time-frequency resources, and decoding fails, user data and control information on a time-frequency resource with a strongest signal are decoded), the network device feeds back a random access response in a format 6. The random access response includes fields such as an RAPID and a backoff indication (optional). In the random access response, the RAPID is the same as an RAPID included in the random access request received by the network device.

After determining, in any one of the foregoing indication manners of the message format of the random access response, that the message format of the received random access response is the format 6, the terminal device starts a new random access procedure after performing backoff, and tries to transmit data.

When the terminal device determines that the message format of the random access response received by the terminal device is any one of the format 4, the format 5, and the format 6, the terminal device considers that uplink user data sent by the terminal device fails to be transmitted, so that uplink user data (the uplink user data is user data sent by using the random access request) in a cache may be still kept.

According to the communication method provided in this embodiment, the terminal device in the inactive state adds the connection identifier and the authentication identifier to the random access request, so that a data bearer can be set up in the random access procedure, thereby implementing data communication between the terminal device and a network side. In addition, different message formats of the random access response correspond to different state transition AND/OR operations, to instruct the terminal device to perform various state transition AND/OR operations.

The foregoing describes the methods in the embodiments in detail, and the following provides apparatuses in the embodiments.

The methods in the embodiments are described above in detail, and the apparatuses in the embodiments are provided below.

Figure 8:
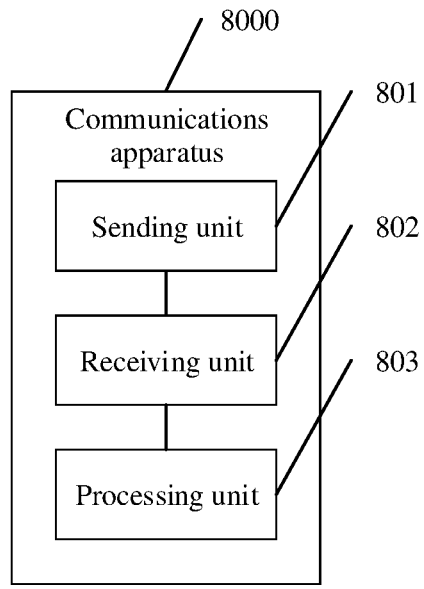
FIG. 8 is a schematic diagram of modules of a communications apparatus according to an embodiment.

The embodiments further provide a communications apparatus. The communications apparatus may be applied to the foregoing communication method. FIG. 8 is a schematic diagram of modules of a communications apparatus 8000 according to an embodiment. The communications apparatus 8000 includes a sending unit 801, configured to send a random access request to a network device, where the random access request includes a random access preamble, control information, and user data, the communications apparatus is in an inactive state, and the control information includes at least a connection identifier and an authentication identifier, a receiving unit 802, configured to receive a random access response sent by the network device, and a processing unit 803, configured to perform a state transition AND/OR operation corresponding to a message format of the random access response. The communications apparatus may be specifically the terminal device in the foregoing embodiments.

Figure 9:
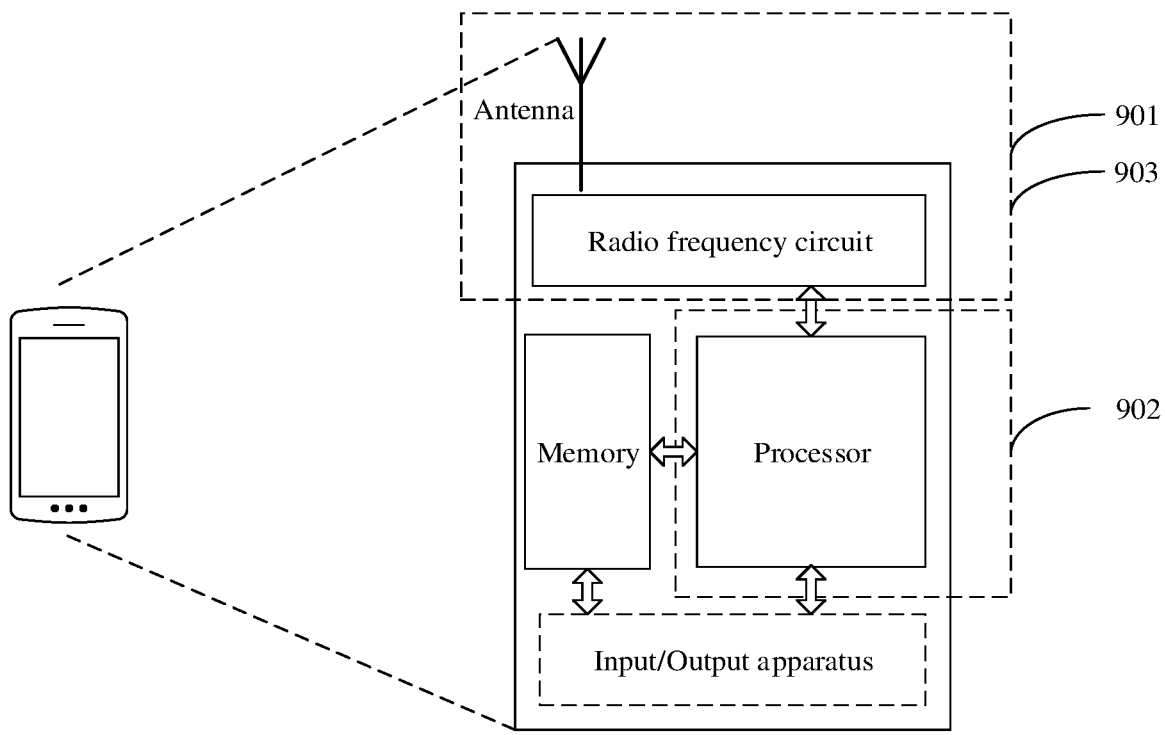
FIG. 9 is a simplified schematic structural diagram of a terminal device.

FIG. 9 shows a simplified schematic structural diagram of a terminal device in an implementation. For ease of understanding and convenience of figure illustration, an example in which the terminal device is a mobile phone is used in FIG. 9. As shown in FIG. 9, the terminal device includes a processor, a memory, a radio frequency circuit, an antenna, and an input/output apparatus. The processor is mainly configured to process a communication protocol and communication data, control the terminal device, execute a software program, process data of the software program, and the like. The memory is mainly configured to store the software program and the data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus such as a touchscreen, a display screen, or a keyboard is mainly configured to receive data entered by a user, and output data to the user. It should be noted that some types of terminal devices may have no input/output apparatus.

When needing to send data, after performing baseband processing on to-be-sent data, the processor outputs a baseband signal to the radio frequency circuit, and the radio frequency circuit performs radio frequency processing on the baseband signal and then sends the radio frequency signal to outside in a form of an electromagnetic wave by using the antenna. When data is sent to the terminal device, the radio frequency circuit receives the radio frequency signal by using the antenna, converts the radio frequency signal into a baseband signal, and outputs the baseband signal to the processor. The processor converts the baseband signal into data, and processes the data. For ease of description, FIG. 9 shows only one memory and processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a receiving and sending function may be considered as a receiving unit and a sending unit of the terminal device (or may be collectively referred to as a transceiver unit), and the processor having a processing function may be considered as a processing unit of the terminal device. As shown in FIG. 9, the terminal device includes a receiving unit 901, a processing unit 902, and a sending unit 903. The receiving unit 901 may also be referred to as a receiver, a receiving device, a receiving circuit, and the like. The sending unit 903 may also be referred to as a sender, a transmitter, a transmitting device, a transmitting circuit, and the like. The processing unit 903 may also be referred to as a processor, a processing board, a processing module, a processing apparatus, or the like.

For example, in an embodiment, the sending unit 903 is configured to perform step S301 in the embodiment shown in FIG. 3. The receiving unit 901 is configured to perform step S302 in the embodiment shown in FIG. 3. The processing unit 902 is configured to perform step S303 in the embodiment shown in FIG. 3.

For another example, in another embodiment, the sending unit 903 is configured to perform step S502 in the embodiment shown in FIG. 5. The receiving unit 901 is configured to perform step S504 in the embodiment shown in FIG. 5. The processing unit 902 is configured to perform step S501, S505, and S506 in the embodiment shown in FIG. 5.

In another implementation, all or some functions of the communications apparatus may be implemented by using a system-on-chip (SoC) technology, for example, implemented by one chip. The chip integrates a kernel, an input/output interface, and the like. The input/output interface may implement functions of the sending unit and the receiving unit, for example, send a random access request in a form of a baseband signal and receive a random access response in a form of a baseband signal. The kernel may implement a function of the processing unit, for example, perform a state transition AND/OR operation corresponding to a message format of the random access response. The functions of the kernel and the input/output interface may be implemented by hardware, or may be implemented by hardware executing corresponding software. The hardware or the software includes one or more modules corresponding to the foregoing functions. In another embodiment, the input/output interface may also be an interface that is of the chip and that is connected to a circuit, a component, or a device other than the chip, and is configured to output a random access request generated by the chip to the circuit, the component, or the device connected to the chip, receive a random access response provided by the circuit, the component, or the device connected to the terminal.

Figure 10:
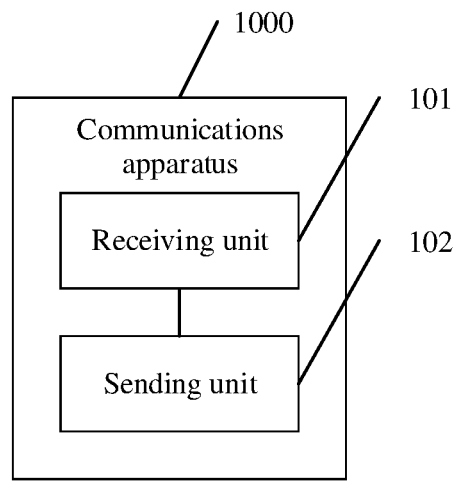
FIG. 10 is a schematic diagram of modules of another communications apparatus according to an embodiment.

The embodiments further provide a communications apparatus. The communications apparatus may be applied to the foregoing communication method. FIG. 10 is a schematic diagram of modules of a communications apparatus according to an embodiment. The communications apparatus 1000 includes a receiving unit 101, configured to receive a random access request sent by a terminal device, where the random access request includes a random access preamble, control information, and user data, the terminal device is in an inactive state, and the control information includes at least a connection identifier and an authentication identifier, and a sending unit 102, configured to send a random access response to the terminal device, where the random access response has at least two message formats, and each message format corresponds to one state transition and/or operation. The communications apparatus may be specifically the network device in the foregoing embodiments.

Figure 11:
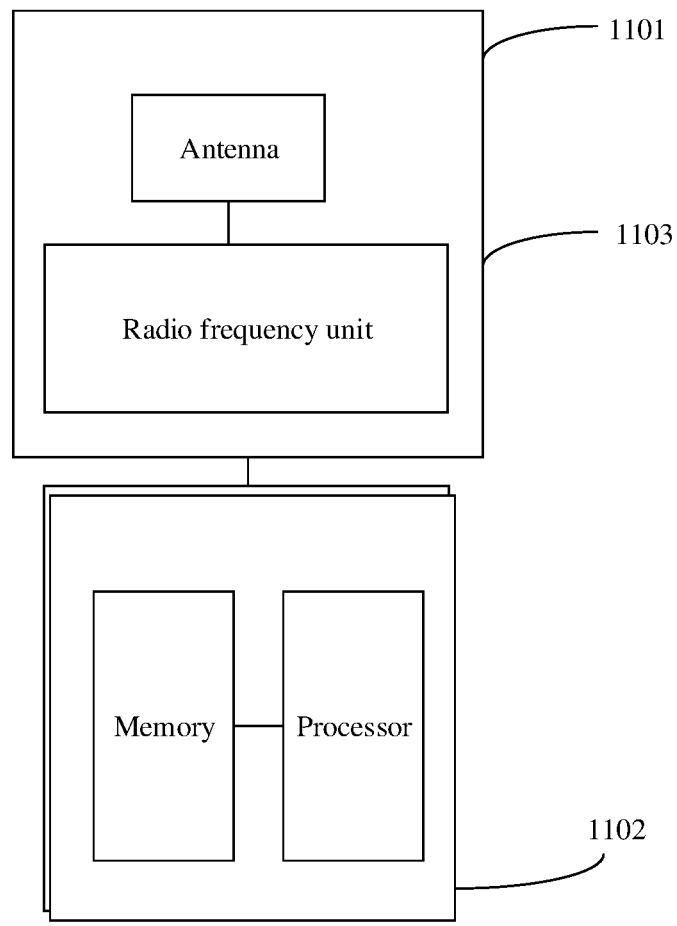
FIG. 11 is a simplified schematic structural diagram of a network device.

FIG. 11 shows a simplified schematic structural diagram of a network device in an implementation. The network device includes a part 1102 and a part for radio frequency signal receiving/sending and conversion. The part for radio frequency signal receiving and sending and conversion further includes a receiving unit 1101 and a sending unit 1103 (which may also be collectively referred to as a transceiver unit). The part for radio frequency signal receiving/sending and conversion is mainly configured to send/receive a radio frequency signal and perform conversion between a radio frequency signal and a baseband signal. The part 112 is mainly configured to perform baseband processing, control the network device, and the like. The receiving unit in may also be referred to as a receiver, a receiving device, a receiving circuit, and the like. The sending unit 113 may also be referred to as a sender, a transmitter, a transmitting device, a transmitting circuit, and the like. The 112 part is usually a control center of the network device, or may be usually referred to as a processing unit, configured to control the network device to perform the steps performed by a second communications apparatus in FIG. 5 or FIG. 9. For details, refer to the foregoing descriptions of the related parts.

The part 112 may include one or more boards. Each board may include one or more processors and one or more memories. The processor is configured to read and execute a program in the memory to implement a baseband processing function and control the network device. If there are a plurality of boards, the boards may be interconnected to enhance a processing capability. In an optional implementation, alternatively, the plurality of boards may share one or more processors, or the plurality of boards share one or more memories.

For example, in an embodiment, the receiving unit in is configured to perform step S301 in FIG. 3, and the sending unit 112 is configured to perform step S302 in FIG. 3.

For another example, in another embodiment, the receiving unit 111 is configured to perform step S502 in FIG. 5, the processing unit 112 is configured to perform step S503 in FIG. 5, and the sending unit 113 is configured to perform step S504 in FIG. 5.

In another implementation, all or some functions of the communications apparatus may be implemented by using a SoC technology, for example, implemented by one chip. The chip integrates a kernel, an input/output interface, and the like. The input/output interface may implement functions of the sending unit and the receiving unit, for example, receive a random access request in a form of a baseband signal and send a random access response in a form of a baseband signal. The kernel may implement a function of the processing unit, for example, perform a state transition AND/OR operation corresponding to a message format of the random access response. The functions of the kernel and the input/output interface may be implemented by hardware, or may be implemented by hardware executing corresponding software. The hardware or the software includes one or more modules corresponding to the foregoing functions. In another embodiment, the input/output interface may also be an interface that is of the chip and that is connected to a circuit, a component, or a device other than the chip, and is configured to output a random access request generated by the chip to the circuit, the component, or the device connected to the chip, receive a random access response provided by the circuit, the component, or the device connected to the terminal.

Whether these functions of the A person of ordinary skill in the art may be aware that, in combination with the examples described in the embodiments disclosed in this specification, units and algorithm steps may be implemented by electronic hardware or a combination of computer software and electronic hardware. Whether these functions are performed by hardware or software depends on a specific application and an implementation constraint of the technical solution. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instruction may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes any medium that can store program code, such as a read-only memory (ROM), a random access memory (RAM), a magnetic disk, or an optical disc.

The invention claimed is:
1. A communication method, comprising:
  sending, by a terminal device, a random access request to a network device, wherein the random access request comprises a random access preamble and uplink data;

receiving, by the terminal device, a random access response sent by the network device, and performing, by the terminal device, a state transition AND/OR operation corresponding to a message format of the random access response that is a message format from a plurality of message formats comprising a first message format, a second message format and a third message format, wherein each message format of the plurality of message formats is different from each other message format;

wherein performing the state transition AND/OR operation comprises performing:
switching, by the terminal device, to a connected state in response to the random access response being in a first message format;
sending, by the terminal device, a radio resource control (RRC) connection request to the network device in response to the random access response being in a second message format; and
resending, by the terminal device, the random access request to the network device in response to the random access response being in a third message format.

2. The method according to claim 1, wherein the random access response being in the first message format comprises the random access response comprising fields having a connection identifier, an uplink timing advance and a cell radio network temporary identifier;
wherein the random access response being in the second message format comprises the random access response comprising fields having a random access preamble sequence identifier, an uplink timing advance, uplink scheduling information and a cell radio network temporary identifier; and
wherein the random access response being in the third message format comprises the random access response comprising a backoff indication.

3. The method according to claim 1, further comprising:
determining, by the terminal device, the message format of the random access response according to a message format field in the random access response.

4. The method according to claim 1, wherein the uplink data comprises a connection identifier.

5. A communication method, comprising:
receiving, by a network device, a random access request sent by a terminal device, wherein the random access request comprises a random access preamble and uplink data; and
sending, by the network device, a random access response to the terminal device, wherein the random access response has a message format that is selected from a plurality of message formats comprising at least three message formats, wherein the at least three message formats comprises a first message format, a second message format and a third message format, wherein each message format of the at least three message formats is different from each other message format;
wherein the random access response being in the first message format triggers the terminal device to switch to a connected state;
wherein the random access response being in the second message format triggers the terminal device to send a radio resource control (RRC) connection request to the network device; and
wherein the random access response being in the third message format triggers the terminal device to resend the random access request to the network device.

6. The method according to claim 5, wherein the random access response being in the first message format comprises the random access response comprising fields having the a connection identifier, an uplink timing advance and a cell radio network temporary identifier;
wherein the random access response being in the second message format comprises the random access response comprising fields having a random access preamble sequence identifier, an uplink timing advance, uplink scheduling information and a cell radio network temporary identifier; and
wherein the random access response being in the third message format comprises the random access response comprising a backoff indication.

7. The method according to claim 6, wherein the random access response comprises a message format field, and wherein the message format field indicates the message format of the random access response.

8. The method according to claim 6, wherein the uplink data comprises a connection identifier.

9. The method according to claim 8, wherein the connection identifier identifies at least one of a radio resource control connection before the terminal device switches from the connected state to an inactive state, or access stratum context information that is of a radio resource control connection and that is saved when the terminal device switches from the connected state to the inactive state.

10. A communications apparatus, comprising:
a transmitter;
a receiver;
a processor; and
a non-transitory computer readable medium having a program stored thereon for execution by the processor, the program including instructions to:
cause the transmitter to send a random access request to a network device, wherein the random access request comprises a random access preamble and uplink data;
receive, through the receiver, a random access response sent by the network device; and
perform a state transition AND/OR operation corresponding to a message format of the random access response that is a message format from a plurality of message formats comprising a first message format, a second message format and a third message format, wherein each message format of the plurality of message formats is different from each other message format;
wherein performing the state transition AND/OR operation comprises performing:
switching to a connected state in response to the random access response being in a first message format;
sending a radio resource control (RRC) connection request to the network device in response to the random access response being in a second message format; and
resending the random access request to the network device in response to the random access response being in a third message format.

11. The communications apparatus according to claim 10, wherein the random access response being in the first message format comprises the random access response comprising fields having a connection identifier, an uplink timing advance and a cell radio network temporary identifier;

wherein the random access response being in the second message format comprises the random access response comprising fields having a random access preamble sequence identifier, an uplink timing advance, uplink scheduling information and a cell radio network temporary identifier; and wherein the random access response being in the third message format comprises the random access response comprising a backoff indication.

12. The communications apparatus according to claim 10, wherein the program further includes instructions to determine the message format of the random access response according to a message format field in the random access response.

13. The communications apparatus according to claim 10, wherein the uplink data comprises a connection identifier.

14. A communications apparatus, comprising:
a receiver;
a transmitter;
a processor; and
a non-transitory computer readable medium having a program stored thereon for execution by the processor, the program including instructions to:
receive, though the receiver, a random access request sent by a terminal device, wherein the random access request comprises a random access preamble and uplink data, and wherein the terminal device is in an inactive state; and
cause the transmitter to send a random access response to the terminal device, wherein the random access response has a message format that is selected from a plurality of message formats comprising at least three message formats, wherein the at least three message formats comprises a first message format, a second message format and a third message format, wherein each message format of the at least three message formats is different from each other message format;
wherein the random access response being in the first message format triggers the terminal device to switch to a connected state;
wherein the random access response being in the second message format triggers the terminal device to send a radio resource control (RRC) connection request to the communications apparatus; and
wherein the random access response being in the third message format triggers the terminal device to resend the random access request to the communications apparatus.

15. The communication apparatus according to claim 14, wherein the random access response being in the first message format comprises the random access response comprising fields having a connection identifier, an uplink timing advance and a cell radio network temporary identifier;
wherein the random access response being in the second message format comprises the random access response comprising fields having a random access preamble sequence identifier, an uplink timing advance, uplink scheduling information and a cell radio network temporary identifier; and
wherein the random access response being in the third message format comprises the random access response comprising a backoff indication.

16. The communication apparatus according to claim 14, wherein the random access response comprises a message format field, and wherein the message format field indicates the message format of the random access response.

17. The communications apparatus according to claim 14, wherein the uplink data comprises a connection identifier.

18. The communications apparatus according to claim 17, wherein the connection identifier identifies at least one of a radio resource control connection before the terminal device switches from a connected state to the inactive state or access stratum context information that is of a radio resource control connection and that is saved when the terminal device switches from the connected state to the inactive state.

19. A non-transitory computer-readable storage medium, the computer-readable storage medium storing a program comprising instructions that, when executed by an apparatus, cause the apparatus to perform:
sending a random access request to a network device, wherein the random access request comprises a random access preamble and uplink data;
receiving a random access response sent by the network device, and
performing a state transition AND/OR operation determined according to a message format of the random access response that is a message format from a plurality of message formats comprising a first message format, a second message format and a third message format, wherein each message format of the plurality of message formats is different from each other message format;
wherein performing the state transition AND/OR operation comprises performing:
switching to a connected state in response to the random access response being in a first message format;
sending a radio resource control (RRC) connection request to the network device in response to the random access response being in a second message format; or
resending the random access request to the network device in response to the random access response being in a third message format.

20. A non-transitory computer-readable storage medium, the computer-readable storage medium storing a program comprising instructions that, when executed by an apparatus, cause the apparatus to perform:
receiving a random access request sent by a terminal device, wherein the random access request comprises a random access preamble and uplink data; and
sending a random access response to the terminal device, wherein the random access response has a message format that is selected from a plurality of message formats comprising at least three message formats, wherein the at least three message formats comprises a first message format, a second message format and a third message format, wherein each message format of the at least three message formats is different from each other message format;
wherein the random access response being in a first message format triggers the terminal device to switch to a connected state;
wherein the random access response being in a second message format triggers the terminal device to send a radio resource control (RRC) connection request to the apparatus; and wherein the random access response being in a third message format triggers the terminal device to resend the random access request to the apparatus.

\* \* \* \* \*

UNITED STATES PATENT AND TRADEMARK OFFICE
CERTIFICATE OF CORRECTION

PATENT NO. : 11,943,815 B2
APPLICATION NO. : 17/862832
DATED : March 26, 2024
INVENTOR(S) : Wang et al.

It is certified that error appears in the above-identified patent and that said Letters Patent is hereby corrected as shown below:

In the Specification

In Column 30, Line 63, delete "in" and insert -- 111 --.

In Column 31, Line 17, delete "in is" and insert -- 111 is --.

Signed and Sealed this
Thirtieth Day of April, 2024

Katherine Kelly Vidal
*Director of the United States Patent and Trademark Office*